(12) United States Patent
Park

(10) Patent No.: US 7,952,972 B2
(45) Date of Patent: May 31, 2011

(54) WRITE-ONCE OPTICAL DISC, AND METHOD AND APPARATUS FOR RECORDING/PLAYBACK MANAGEMENT INFORMATION ON/FROM OPTICAL DISC

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 250 days.

(21) Appl. No.: 12/340,457

(22) Filed: Dec. 19, 2008

(65) Prior Publication Data

US 2009/0129226 A1 May 21, 2009

Related U.S. Application Data

(63) Continuation of application No. 11/984,172, filed on Nov. 14, 2007, now Pat. No. 7,672,208, which is a continuation of application No. 10/911,727, filed on Aug. 5, 2004, now Pat. No. 7,313,065.

(60) Provisional application No. 60/546,961, filed on Feb. 24, 2004.

(30) Foreign Application Priority Data

Aug. 5, 2003 (KR) .............................. 10-2003-54165
Oct. 20, 2003 (KR) .............................. 10-2003-73088
May 10, 2004 (KR) .............................. 10-2004-32677

(51) Int. Cl.
*G11B 7/00* (2006.01)

(52) U.S. Cl. ................................................. 369/53.15

(58) Field of Classification Search ............... 369/53.12, 369/53.13, 53.14, 53.15, 53.17, 53.1, 275.3, 369/47.27; 718/8
See application file for complete search history.

(56) References Cited

U.S. PATENT DOCUMENTS

| | | |
|---|---|---|
| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |

(Continued)

FOREIGN PATENT DOCUMENTS

CN 1134017 A 10/1996

(Continued)

OTHER PUBLICATIONS

JIS Handbook data processing for hardware, Japan, Japanese Standards Association Inc., Apr. 21, 1999, pp. 1064-1070.

(Continued)

*Primary Examiner* — Nabil Z Hindi
(74) *Attorney, Agent, or Firm* — Birch, Stewart, Kolasch & Birch, LLP

(57) ABSTRACT

An apparatus and method for recording and reproducing data are discussed. According to an embodiment, the present invention provides an apparatus for recording management information on a writable recording medium, the recording medium including one or more temporary management areas being used in a designated order for storing therein temporary management information until the recording medium is closed and a final management area for storing therein final management information when the recording medium is to be closed, the apparatus comprising a pickup adapted for recording data on the recording medium and a microcomputer configured to control the pickup to record data onto a first indicator when closing the recording medium so as to indicate that the recording medium is closed, the first indicator located at the most front position of a first temporary management area being used first among the one or more temporary management areas.

45 Claims, 12 Drawing Sheets

< Dual Layer Disc >

U.S. PATENT DOCUMENTS

| | | | |
|---|---|---|---|
| 5,051,849 | A | 9/1991 | Fukushima et al. |
| 5,065,388 | A | 11/1991 | Roth et al. |
| 5,068,842 | A | 11/1991 | Naito et al. |
| 5,111,444 | A | 5/1992 | Fukushima et al. |
| 5,210,734 | A | 5/1993 | Sakurai et al. |
| 5,235,585 | A | 8/1993 | Bish et al. |
| 5,237,553 | A | 8/1993 | Fukushima et al. |
| 5,243,588 | A | 9/1993 | Maeda et al. |
| 5,247,494 | A | 9/1993 | Ohno et al. |
| 5,289,450 | A | 2/1994 | Mizumoto et al. |
| 5,319,626 | A | 6/1994 | Ozaki et al. |
| 5,323,367 | A | 6/1994 | Tamura et al. |
| 5,343,456 | A | 8/1994 | Maeda |
| 5,345,433 | A | 9/1994 | Ohga et al. |
| 5,404,357 | A | 4/1995 | Ito et al. |
| 5,408,478 | A | 4/1995 | Ohmori et al. |
| 5,418,762 | A | 5/1995 | Kitayama |
| 5,418,767 | A | 5/1995 | Gaudet et al. |
| 5,426,624 | A | 6/1995 | Goto |
| 5,442,611 | A | 8/1995 | Hosaka et al. |
| 5,448,728 | A | 9/1995 | Takano et al. |
| 5,475,668 | A | 12/1995 | Azumatani et al. |
| 5,475,820 | A | 12/1995 | Natrasevschi et al. |
| 5,481,519 | A | 1/1996 | Hosoya et al. |
| 5,495,466 | A | 2/1996 | Dohmeier et al. |
| 5,497,361 | A | 3/1996 | Mita et al. |
| 5,526,335 | A | 6/1996 | Tamegai |
| 5,528,571 | A | 6/1996 | Funahashi et al. |
| 5,553,045 | A | 9/1996 | Obata et al. |
| 5,555,537 | A | 9/1996 | Imaino et al. |
| 5,577,194 | A | 11/1996 | Wells et al. |
| 5,608,715 | A | 3/1997 | Yokogawa et al. |
| 5,633,764 | A | 5/1997 | Ohta |
| 5,644,539 | A | 7/1997 | Yamagami et al. |
| 5,666,335 | A | 9/1997 | Horibe |
| 5,666,531 | A | 9/1997 | Martin |
| 5,715,221 | A | 2/1998 | Ito et al. |
| 5,720,030 | A | 2/1998 | Kamihara et al. |
| 5,740,435 | A | 4/1998 | Yamamoto et al. |
| 5,745,444 | A | 4/1998 | Ichikawa et al. |
| 5,799,212 | A | 8/1998 | Ohmori |
| 5,802,028 | A | 9/1998 | Igarashi |
| 5,805,536 | A | 9/1998 | Gage et al. |
| 5,820,962 | A | 10/1998 | Kimura et al. |
| 5,825,726 | A | 10/1998 | Hwang et al. |
| 5,848,038 | A | 12/1998 | Igarashi |
| 5,860,088 | A | 1/1999 | Benhase et al. |
| 5,862,117 | A | 1/1999 | Fuentes et al. |
| 5,867,455 | A | 2/1999 | Miyamoto et al. |
| 5,872,750 | A | 2/1999 | Satoh |
| 5,878,020 | A | 3/1999 | Takahashi et al. |
| 5,890,206 | A | 3/1999 | Koike |
| 5,914,928 | A | 6/1999 | Takahashi et al. |
| 5,930,815 | A | 7/1999 | Estakhri et al. |
| 5,936,925 | A | 8/1999 | Yoshio et al. |
| 5,940,702 | A | 8/1999 | Sakao et al. |
| 5,940,854 | A | 8/1999 | Green, Jr. et al. |
| 5,966,358 | A | 10/1999 | Mine |
| 6,031,804 | A | 2/2000 | Yamamuro |
| 6,058,085 | A | 5/2000 | Obata et al. |
| 6,089,455 | A | 7/2000 | Yagita |
| 6,118,608 | A | 9/2000 | Kakihara et al. |
| 6,118,737 | A | 9/2000 | Hutter |
| 6,138,203 | A | 10/2000 | Inokuchi et al. |
| 6,160,778 | A | 12/2000 | Ito et al. |
| 6,182,240 | B1 | 1/2001 | Mine |
| 6,189,118 | B1 | 2/2001 | Sasaki et al. |
| 6,205,099 | B1 | 3/2001 | Sasaki et al. |
| 6,212,647 | B1 | 4/2001 | Sims, III et al. |
| 6,233,654 | B1 | 5/2001 | Aoki et al. |
| 6,249,884 | B1 | 6/2001 | Joo |
| 6,249,888 | B1 | 6/2001 | Sasaki et al. |
| 6,292,445 | B1 | 9/2001 | Ito et al. |
| 6,301,220 | B1 | 10/2001 | Takagi et al. |
| 6,314,078 | B1 | 11/2001 | Takagi et al. |
| 6,336,202 | B1 | 1/2002 | Tsuchimoto et al. |
| 6,341,109 | B1 | 1/2002 | Kayanuma et al. |
| 6,341,278 | B1 | 1/2002 | Yamamoto et al. |
| 6,373,800 | B1 | 4/2002 | Takahashi et al. |
| 6,393,513 | B2 | 5/2002 | Estakhri et al. |
| 6,405,332 | B1 | 6/2002 | Bando et al. |
| 6,414,923 | B1 | 7/2002 | Park et al. |
| 6,415,350 | B2 | 7/2002 | Asoh |
| 6,418,100 | B1 | 7/2002 | Park et al. |
| 6,447,126 | B1 | 9/2002 | Hornbeck |
| 6,466,532 | B1 | 10/2002 | Ko et al. |
| 6,469,978 | B1 | 10/2002 | Ohata et al. |
| 6,477,126 | B1 | 11/2002 | Park et al. |
| 6,480,446 | B1 | 11/2002 | Ko et al. |
| 6,493,301 | B1 | 12/2002 | Park et al. |
| 6,493,302 | B2 | 12/2002 | Takahashi |
| 6,496,807 | B1 | 12/2002 | Inokuchi et al. |
| 6,526,522 | B1 | 2/2003 | Park et al. |
| 6,529,458 | B1 | 3/2003 | Shin et al. |
| 6,542,450 | B1 | 4/2003 | Park et al. |
| 6,545,833 | B1 | 4/2003 | Ee et al. |
| 6,564,345 | B1 | 5/2003 | Kim et al. |
| 6,574,419 | B1 | 6/2003 | Nonomura et al. |
| 6,581,167 | B1 | 6/2003 | Gotoh et al. |
| 6,594,725 | B2 | 7/2003 | Ando et al. |
| 6,606,285 | B1 | 8/2003 | Ijtsma et al. |
| 6,615,363 | B1 | 9/2003 | Fukasawa et al. |
| 6,631,106 | B1 | 10/2003 | Numata et al. |
| 6,633,724 | B1 | 10/2003 | Hasegawa et al. |
| 6,667,939 | B1 | 12/2003 | Miyamoto et al. |
| 6,671,243 | B2 | 12/2003 | Ando et al. |
| 6,671,249 | B2 | 12/2003 | Horie et al. |
| 6,697,306 | B2 | 2/2004 | Sako et al. |
| 6,714,502 | B2 | 3/2004 | Ko et al. |
| 6,724,701 | B2 | 4/2004 | Ijtsma et al. |
| 6,738,341 | B2 | 5/2004 | Ohata et al. |
| 6,754,860 | B2 | 6/2004 | Kim et al. |
| 6,760,288 | B2 | 7/2004 | Ijtsma et al. |
| 6,763,429 | B1 | 7/2004 | Hirayama et al. |
| 6,766,418 | B1 | 7/2004 | Alexander et al. |
| 6,782,488 | B1 | 8/2004 | Park et al. |
| 6,785,206 | B1 | 8/2004 | Lee et al. |
| 6,785,219 | B1 | 8/2004 | Sasaki et al. |
| 6,788,631 | B1 | 9/2004 | Park et al. |
| 6,795,389 | B1 | 9/2004 | Nishiuchi et al. |
| RE38,638 | E | 10/2004 | Yonemitsu et al. |
| 6,804,797 | B2 | 10/2004 | Ko et al. |
| 6,826,140 | B2 | 11/2004 | Brommer et al. |
| 6,842,580 | B1 | 1/2005 | Ueda et al. |
| 6,845,069 | B2 | 1/2005 | Nakahara et al. |
| 6,845,072 | B1 | 1/2005 | Weirauch |
| 6,883,111 | B2 | 4/2005 | Yoshida et al. |
| 6,892,327 | B2 | 5/2005 | Ko et al. |
| 6,918,003 | B2 | 7/2005 | Sasaki et al. |
| 6,922,802 | B2 | 7/2005 | Kim et al. |
| 6,934,236 | B2 | 8/2005 | Lee et al. |
| 6,957,360 | B2 | 10/2005 | Sims, III et al. |
| 6,999,398 | B2 | 2/2006 | Yamamoto et al. |
| 7,002,882 | B2 | 2/2006 | Takahashi et al. |
| 7,027,059 | B2 | 4/2006 | Hux et al. |
| 7,027,373 | B2 | 4/2006 | Ueda et al. |
| 7,031,239 | B2 | 4/2006 | Takahashi et al. |
| 7,042,825 | B2 | 5/2006 | Yamamoto et al. |
| 7,050,701 | B1 | 5/2006 | Sasaki et al. |
| 7,092,334 | B2 | 8/2006 | Choi et al. |
| 7,123,556 | B2 | 10/2006 | Ueda et al. |
| 7,149,171 | B2 | 12/2006 | Yamawaki |
| 7,149,930 | B2 | 12/2006 | Ogawa et al. |
| 7,161,879 | B2 | 1/2007 | Hwang et al. |
| 7,184,377 | B2 | 2/2007 | Ito et al. |
| 7,188,271 | B2 | 3/2007 | Park et al. |
| 7,233,550 | B2 | 6/2007 | Park et al. |
| 7,236,687 | B2 | 6/2007 | Kato et al. |
| 7,248,541 | B2 | 7/2007 | Yonezawa |
| 7,272,086 | B2 | 9/2007 | Hwang et al. |
| 7,283,727 | B1 | 10/2007 | Van Gestel |
| 7,289,404 | B2 | 10/2007 | Park et al. |
| 7,296,178 | B2 | 11/2007 | Yoshida et al. |
| 7,313,066 | B2 | 12/2007 | Hwang et al. |
| 7,317,670 | B2 | 1/2008 | Park |
| 7,327,654 | B2 | 2/2008 | Hwang et al. |
| 7,337,354 | B2 * | 2/2008 | Yoshida et al. .................. 714/8 |

| | | |
|---|---|---|
| 7,349,301 B2 | 3/2008 | Terada et al. |
| 7,355,934 B2 | 4/2008 | Park et al. |
| 7,372,788 B2 | 5/2008 | Park et al. |
| 7,372,792 B2 | 5/2008 | Park |
| 7,379,402 B2 | 5/2008 | Ko et al. |
| 7,428,202 B2 | 9/2008 | Takahashi et al. |
| 7,428,670 B2 | 9/2008 | Hwang et al. |
| 7,483,349 B2 | 1/2009 | Park et al. |
| 7,483,355 B2 | 1/2009 | Park |
| 7,506,109 B2 | 3/2009 | Park |
| 7,533,319 B2 | 5/2009 | Hwang et al. |
| 7,545,720 B2 | 6/2009 | Hwang et al. |
| 7,548,500 B2 | 6/2009 | Hwang et al. |
| 7,613,874 B2 | 11/2009 | Park |
| 7,742,372 B2 | 6/2010 | Kwon et al. |
| 2001/0009537 A1 | 7/2001 | Park |
| 2001/0011267 A1 | 8/2001 | Kihara et al. |
| 2001/0014070 A1 | 8/2001 | Ando et al. |
| 2001/0020261 A1 | 9/2001 | Ando et al. |
| 2001/0021144 A1 | 9/2001 | Oshima et al. |
| 2001/0026511 A1 | 10/2001 | Ueda et al. |
| 2001/0033517 A1 | 10/2001 | Ando et al. |
| 2001/0034855 A1 | 10/2001 | Ando et al. |
| 2001/0034863 A1 | 10/2001 | Ko et al. |
| 2001/0043525 A1 | 11/2001 | Ito et al. |
| 2001/0043800 A1 | 11/2001 | Gotoh et al. |
| 2001/0051033 A1 | 12/2001 | Yoshida et al. |
| 2001/0055260 A1 | 12/2001 | Numata |
| 2002/0007472 A1 | 1/2002 | Ko et al. |
| 2002/0025138 A1 | 2/2002 | Isobe et al. |
| 2002/0035705 A1 | 3/2002 | Ando et al. |
| 2002/0049938 A1 | 4/2002 | Ko |
| 2002/0055012 A1 | 5/2002 | Chou et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0105868 A1 | 8/2002 | Ko |
| 2002/0133485 A1 | 9/2002 | Furuhashi |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0145966 A1 | 10/2002 | Hirotsune et al. |
| 2002/0159382 A1 | 10/2002 | Ohata et al. |
| 2002/0161774 A1 | 10/2002 | Tol et al. |
| 2002/0163326 A1 | 11/2002 | Choi et al. |
| 2002/0176341 A1 | 11/2002 | Ko et al. |
| 2002/0186341 A1 | 12/2002 | Yamamura et al. |
| 2003/0072236 A1 | 4/2003 | Hirotsune et al. |
| 2003/0095482 A1 | 5/2003 | Hung et al. |
| 2003/0095484 A1 | 5/2003 | Motohashi |
| 2003/0103427 A1 | 6/2003 | Yeo et al. |
| 2003/0126527 A1 | 7/2003 | Kim et al. |
| 2003/0133369 A1 | 7/2003 | Sasaki |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0137913 A1 | 7/2003 | Oshima et al. |
| 2003/0142608 A1 | 7/2003 | Yamamoto et al. |
| 2003/0149918 A1 | 8/2003 | Takaichi |
| 2003/0156471 A1 | 8/2003 | Ueda et al. |
| 2003/0161239 A1 | 8/2003 | Yamawaki |
| 2003/0173669 A1 | 9/2003 | Shau |
| 2003/0179669 A1 | 9/2003 | Takahashi et al. |
| 2003/0198155 A1 | 10/2003 | Go et al. |
| 2003/0237024 A1 | 12/2003 | Ogawa et al. |
| 2004/0001408 A1 | 1/2004 | Propps et al. |
| 2004/0004917 A1 | 1/2004 | Lee |
| 2004/0022171 A1 | 2/2004 | Ko |
| 2004/0042363 A1 | 3/2004 | Kobayashi et al. |
| 2004/0057363 A1 | 3/2004 | Tsukihashi et al. |
| 2004/0062159 A1 | 4/2004 | Park et al. |
| 2004/0062160 A1 | 4/2004 | Park et al. |
| 2004/0073832 A1 | 4/2004 | Ko |
| 2004/0076084 A1 | 4/2004 | Yonezawa |
| 2004/0076096 A1 | 4/2004 | Hwang et al. |
| 2004/0090888 A1 | 5/2004 | Park et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0160799 A1 | 8/2004 | Park et al. |
| 2004/0165495 A1 | 8/2004 | Park et al. |
| 2004/0170101 A1 | 9/2004 | Nakajo |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179455 A1 | 9/2004 | Maruyama et al. |
| 2004/0179458 A1 | 9/2004 | Hwang et al. |
| 2004/0190406 A1 | 9/2004 | Hwang et al. |
| 2004/0193946 A1 | 9/2004 | Park et al. |
| 2004/0218488 A1 | 11/2004 | Hwang et al. |
| 2004/0223427 A1 | 11/2004 | Kim et al. |
| 2004/0246849 A1 | 12/2004 | Hwang et al. |
| 2004/0246851 A1 | 12/2004 | Hwang et al. |
| 2004/0246852 A1 | 12/2004 | Hwang et al. |
| 2004/0257934 A1 | 12/2004 | Gotoh et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083804 A1 | 4/2005 | Hwang et al. |
| 2005/0083830 A1 | 4/2005 | Martens et al. |
| 2005/0111315 A1 | 5/2005 | Hwang et al. |
| 2005/0175323 A1 | 8/2005 | Hoshizawa |
| 2005/0195716 A1 | 9/2005 | Ko et al. |
| 2005/0207262 A1 | 9/2005 | Terada et al. |
| 2005/0237875 A1 | 10/2005 | Yamanaka et al. |
| 2005/0289389 A1 | 12/2005 | Yamagami et al. |
| 2006/0039268 A1 | 2/2006 | Yamanaka |
| 2006/0044979 A1 | 3/2006 | Kuraoka et al. |
| 2006/0077827 A1 | 4/2006 | Takahashi |
| 2006/0077872 A1 | 4/2006 | Hwang et al. |
| 2006/0117241 A1 | 6/2006 | Ko et al. |
| 2006/0136134 A1 | 6/2006 | Mihara |
| 2006/0195719 A1 | 8/2006 | Ueda et al. |
| 2006/0203635 A1 | 9/2006 | Ko et al. |
| 2006/0203638 A1 | 9/2006 | Ko et al. |
| 2006/0203684 A1 | 9/2006 | Ko et al. |
| 2006/0227694 A1 | 10/2006 | Woerlee et al. |
| 2006/0233078 A1 | 10/2006 | Terada et al. |
| 2006/0280076 A1 | 12/2006 | Bondijk |
| 2007/0122124 A1 | 5/2007 | Park et al. |
| 2007/0211591 A1 | 9/2007 | Park et al. |
| 2007/0294571 A1 | 12/2007 | Park et al. |
| 2008/0046780 A1 | 2/2008 | Shibuya et al. |
| 2008/0273448 A1 | 11/2008 | Nakamura |
| 2008/0279073 A1 | 11/2008 | Gotoh et al. |
| 2009/0028015 A1 | 1/2009 | Park et al. |

FOREIGN PATENT DOCUMENTS

| | | |
|---|---|---|
| CN | 1140897 C | 1/1997 |
| CN | 1227950 A | 9/1999 |
| CN | 1246707 A | 3/2000 |
| CN | 1273419 A | 11/2000 |
| CN | 1294385 A | 5/2001 |
| CN | 1304633 A | 7/2001 |
| CN | 1328327 A | 12/2001 |
| CN | 1329334 A | 1/2002 |
| CN | 1338102 A | 2/2002 |
| CN | 1342314 A | 3/2002 |
| CN | 1479304 A | 3/2004 |
| CN | 1852217 A | 8/2005 |
| CN | 1675708 A | 9/2005 |
| CN | 1685426 A | 10/2005 |
| CN | 1296903 C | 1/2007 |
| DE | 199 54 054 A1 | 6/2000 |

| | | | | | | |
|---|---|---|---|---|---|---|
| EP | 0314186 A2 | 5/1989 | | JP | 9-282849 A | 10/1997 |
| EP | 0325823 A1 | 8/1989 | | JP | 9288884 | 11/1997 |
| EP | 0350920 A2 | 1/1990 | | JP | 9-320204 A | 12/1997 |
| EP | 0 428 208 A2 | 5/1991 | | JP | 10-050005 A | 2/1998 |
| EP | 0464811 A2 | 1/1992 | | JP | 10-050032 A | 2/1998 |
| EP | 0472484 A2 | 2/1992 | | JP | 10-187356 | 7/1998 |
| EP | 0477503 A2 | 4/1992 | | JP | 10-187357 | 7/1998 |
| EP | 484555 A1 | 5/1992 | | JP | 10-187358 | 7/1998 |
| EP | 0556046 A1 | 8/1993 | | JP | 10-187359 | 7/1998 |
| EP | 0871172 A2 | 10/1998 | | JP | 10-187360 | 7/1998 |
| EP | 0908882 A2 | 4/1999 | | JP | 10-187361 A1 | 7/1998 |
| EP | 0957477 A2 | 11/1999 | | JP | 10-199154 A | 7/1998 |
| EP | 0 971 345 A1 | 1/2000 | | JP | 10-222316 A | 8/1998 |
| EP | 0974967 A1 | 1/2000 | | JP | 10-261286 A | 9/1998 |
| EP | 0989554 A1 | 3/2000 | | JP | 10-289524 A | 10/1998 |
| EP | 0997904 A1 | 5/2000 | | JP | 10-320924 A | 12/1998 |
| EP | 1026681 B1 | 8/2000 | | JP | 11-39801 A | 2/1999 |
| EP | 1 040 937 A1 | 10/2000 | | JP | 11-66751 A | 3/1999 |
| EP | 1043723 A1 | 10/2000 | | JP | 11-86418 A | 3/1999 |
| EP | 1132914 A2 | 9/2001 | | JP | 11-86436 A | 3/1999 |
| EP | 1 143 444 A2 | 10/2001 | | JP | 11-96684 A | 4/1999 |
| EP | 1148493 A2 | 10/2001 | | JP | 11110888 | 4/1999 |
| EP | 1152402 A1 | 11/2001 | | JP | 11-134809 A | 5/1999 |
| EP | 1152414 A2 | 11/2001 | | JP | 11-203792 A | 7/1999 |
| EP | 1239478 A1 | 9/2002 | | JP | 11306648 | 11/1999 |
| EP | 1274081 A2 | 1/2003 | | JP | 11-353857 A | 12/1999 |
| EP | 1 304 698 A2 | 4/2003 | | JP | 2000-40308 A | 2/2000 |
| EP | 1298659 A1 | 4/2003 | | JP | 2000-090588 A | 3/2000 |
| EP | 1 321 940 A1 | 6/2003 | | JP | 2000-105980 A | 4/2000 |
| EP | 1329888 A1 | 7/2003 | | JP | 2000-149449 A | 5/2000 |
| EP | 1347452 A2 | 9/2003 | | JP | 2000-195178 A | 7/2000 |
| EP | 1 547 065 | 6/2005 | | JP | 2000-215612 | 8/2000 |
| EP | 1547066 A1 | 6/2005 | | JP | 2000-215644 A | 8/2000 |
| EP | 1552510 A1 | 7/2005 | | JP | 2000-285607 A | 10/2000 |
| EP | 1564740 A1 | 8/2005 | | JP | 2000-293948 A | 10/2000 |
| EP | 1 573 723 | 9/2005 | | JP | 2000-293954 A | 10/2000 |
| EP | 1576603 A2 | 9/2005 | | JP | 2000-298954 A | 10/2000 |
| EP | 1595251 A1 | 11/2005 | | JP | 2000285000 A | 10/2000 |
| EP | 1599869 B1 | 11/2005 | | JP | 2000-322835 A | 11/2000 |
| EP | 1612790 A1 | 1/2006 | | JP | 2000-322837 A | 11/2000 |
| EP | 1623422 | 2/2006 | | JP | 2000-322875 A | 11/2000 |
| EP | 1 652 174 A1 | 5/2006 | | JP | 2000-322876 A | 11/2000 |
| EP | 1 652 175 A1 | 5/2006 | | JP | 2000-339874 A | 12/2000 |
| EP | 1 662 505 A1 | 5/2006 | | JP | 2000-348057 A | 12/2000 |
| GB | 2356735 A | 5/2001 | | JP | 2001-14809 A | 1/2001 |
| JP | 945004 C | 3/1979 | | JP | 2001-023317 A | 1/2001 |
| JP | 63-091842 A | 4/1988 | | JP | 2001-069440 A | 3/2001 |
| JP | 64-46280 A | 2/1989 | | JP | 2001-110168 A | 4/2001 |
| JP | 64-49991 A | 2/1989 | | JP | 2001-148166 A | 5/2001 |
| JP | 64-79940 A | 3/1989 | | JP | 2001-236743 A | 8/2001 |
| JP | 01-263955 A | 10/1989 | | JP | 2001-266464 A | 9/2001 |
| JP | 2-23417 A | 1/1990 | | JP | 2001-319339 A | 11/2001 |
| JP | 02-023417 A | 1/1990 | | JP | 2001-351314 A | 12/2001 |
| JP | 2-54327 A | 2/1990 | | JP | 2001-351334 A | 12/2001 |
| JP | 2-152072 A | 6/1990 | | JP | 2001-357623 A | 12/2001 |
| JP | 3-46164 A | 2/1991 | | JP | 2001-357635 A | 12/2001 |
| JP | 4-114371 A | 4/1992 | | JP | 2002-8247 A | 1/2002 |
| JP | 4 172662 A | 6/1992 | | JP | 2002-015507 A | 1/2002 |
| JP | 5-46456 A | 2/1993 | | JP | 2002-015525 A | 1/2002 |
| JP | 05-274814 A | 10/1993 | | JP | 2002-50131 A | 2/2002 |
| JP | 6-20449 A | 1/1994 | | JP | 2002-056619 A | 2/2002 |
| JP | 6-259886 A | 6/1994 | | JP | 2002-56620 A | 2/2002 |
| JP | 6-309802 A | 11/1994 | | JP | 2002-109834 A | 4/2002 |
| JP | 6-338139 A | 12/1994 | | JP | 2002117649 | 4/2002 |
| JP | 06-349201 A | 12/1994 | | JP | 2002117652 | 4/2002 |
| JP | 7-29177 A | 1/1995 | | JP | 2002-157832 A | 5/2002 |
| JP | 7-121993 A | 5/1995 | | JP | 2002-170342 A | 6/2002 |
| JP | 7-168749 A | 7/1995 | | JP | 2002-215612 A | 8/2002 |
| JP | 220400 A | 8/1995 | | JP | 2002-245723 A | 8/2002 |
| JP | 8-50766 A | 2/1996 | | JP | 2002-288938 A | 10/2002 |
| JP | 08-096522 A | 4/1996 | | JP | 2002-324002 A | 11/2002 |
| JP | 8-147702 A | 6/1996 | | JP | 2002-329321 A | 11/2002 |
| JP | 8-273162 A | 10/1996 | | JP | 2002-352522 A | 12/2002 |
| JP | 8-286841 A | 11/1996 | | JP | 2003-30844 A | 1/2003 |
| JP | 8-287595 A | 11/1996 | | JP | 2003-505813 A | 2/2003 |
| JP | 09-145634 A | 6/1997 | | JP | 2003-91938 A | 3/2003 |
| JP | 09-231053 A | 9/1997 | | JP | 2003-510742 A | 3/2003 |
| JP | 9-251721 A | 9/1997 | | JP | 2003-151216 A | 5/2003 |
| JP | 9-270175 A | 10/1997 | | JP | 2003-208759 A | 7/2003 |

| | | | | | | | |
|---|---|---|---|---|---|---|---|
| JP | 2003-228962 | A | 8/2003 | TW | 413805 | | 12/2000 |
| JP | 2003-249029 | A | 9/2003 | TW | 452770 | | 9/2001 |
| JP | 2003-264800 | A | 9/2003 | TW | 484119 | | 4/2002 |
| JP | 2004-539648 | T | 9/2003 | TW | 486913 | | 5/2002 |
| JP | 2003-276843 | A | 10/2003 | TW | 495750 | B | 7/2002 |
| JP | 2003-335062 | A | 11/2003 | TW | 508592 | | 11/2002 |
| JP | 2003-536194 | A | 12/2003 | TW | 509890 | A | 11/2002 |
| JP | 2004-79087 | A | 3/2004 | TW | 518573 | | 1/2003 |
| JP | 2004-95057 | A | 3/2004 | TW | 200401275 | B | 1/2004 |
| JP | 2004-118910 | A | 4/2004 | TW | 200402045 | B | 2/2004 |
| JP | 2004-171714 | A | 6/2004 | TW | 200403663 | B | 3/2004 |
| JP | 2004-213774 | A | 7/2004 | WO | WO-84/00628 | A1 | 2/1984 |
| JP | 2004/077432 | A1 | 9/2004 | WO | WO-96/30902 | A1 | 10/1996 |
| JP | 2004/527436 | T | 9/2004 | WO | WO-97/22182 | A1 | 6/1997 |
| JP | 2004-280864 | A | 10/2004 | WO | WO-97/36296 | A1 | 10/1997 |
| JP | 2004-280865 | A | 10/2004 | WO | WO-00/07185 | A1 | 2/2000 |
| JP | 2004-280866 | A | 10/2004 | WO | WO 0007300 | A1 | 2/2000 |
| JP | 2004-303381 | A | 10/2004 | WO | WO 00/19432 | A1 | 4/2000 |
| JP | 2005044495 | A | 1/2005 | WO | WO-00/54274 | A1 | 9/2000 |
| JP | 2005-32374 | A | 2/2005 | WO | WO 01/22416 | A1 | 3/2001 |
| JP | 2005-56542 | A | 3/2005 | WO | WO-01/22416 | A1 | 3/2001 |
| JP | 2005/004912 | A | 6/2005 | WO | WO-01/24179 | A1 | 4/2001 |
| JP | 2005-196903 | A | 7/2005 | WO | WO-01/35408 | A1 | 5/2001 |
| JP | 2005-535993 | A | 11/2005 | WO | WO-01/75879 | A1 | 10/2001 |
| JP | 2005-538490 | A | 12/2005 | WO | 01/95330 | A2 | 12/2001 |
| JP | 2005-538491 | A | 12/2005 | WO | WO-01/93035 | A2 | 12/2001 |
| JP | 2005339773 | A | 12/2005 | WO | WO-01/95330 | A2 | 12/2001 |
| JP | 2006-500707 | A | 1/2006 | WO | WO 02/057195 | A1 | 7/2002 |
| JP | 2006-501590 | A | 1/2006 | WO | WO-02/086888 | A2 | 10/2002 |
| JP | 2006-502520 | A | 1/2006 | WO | WO 02086887 | A1 | 10/2002 |
| JP | 2006-503396 | A | 1/2006 | WO | WO-03/007296 | A1 | 1/2003 |
| JP | 2006-85859 | A | 3/2006 | WO | WO-03/025924 | A1 | 3/2003 |
| JP | 2006-507733 | A | 3/2006 | WO | WO-03/030172 | A2 | 4/2003 |
| JP | 2006-512699 | A | 4/2006 | WO | WO-03/063165 | A1 | 7/2003 |
| JP | 2006-513519 | T | 4/2006 | WO | WO-03/079353 | A1 | 9/2003 |
| JP | 2008-514389 | A | 4/2006 | WO | WO 03/105138 | A1 | 12/2003 |
| JP | 2006-518533 | A | 8/2006 | WO | WO 03/105141 | A1 | 12/2003 |
| JP | 2006-519445 | A | 8/2006 | WO | WO 03105152 | A1 | 12/2003 |
| JP | 2006-519455 | A | 8/2006 | WO | WO-2004/015707 | A1 | 2/2004 |
| JP | 2006-520064 | T | 8/2006 | WO | WO-2004/015708 | A1 | 2/2004 |
| JP | 2006-522991 | A | 10/2006 | WO | WO-2004/075180 | A1 | 2/2004 |
| JP | 2007-501488 | A | 1/2007 | WO | WO-2004/025648 | | 3/2004 |
| JP | 2007-502512 | A | 2/2007 | WO | WO-2004/025649 | | 3/2004 |
| JP | 2007066515 | A | 3/2007 | WO | WO 2004/0129331 | A1 | 3/2004 |
| JP | 2008-511095 | T | 4/2008 | WO | WO 2004/027775 | A1 | 4/2004 |
| JP | 2008-112577 | A | 5/2008 | WO | WO-2004/029668 | A2 | 4/2004 |
| JP | 2009-203493 | A | 9/2009 | WO | WO-2004/029941 | A1 | 4/2004 |
| JP | 2009-283131 | A | 12/2009 | WO | WO 2004/029941 | A1 | 4/2004 |
| KR | 2000-0018533 | A | 4/2000 | WO | WO 2004/029942 | A1 | 4/2004 |
| KR | 2000-0032046 | A | 6/2000 | WO | WO-2004/029942 | A1 | 4/2004 |
| KR | 2000-0033285 | A | 6/2000 | WO | WO-2004/029968 | A2 | 4/2004 |
| KR | 10-2002-0007298 | A | 1/2002 | WO | WO-2004/034396 | A1 | 4/2004 |
| KR | 10-2002-0081411 | A | 10/2002 | WO | WO 2004/034396 | A1 | 4/2004 |
| KR | 10-2003-0067650 | A | 8/2003 | WO | WO-2004/036561 | A1 | 4/2004 |
| KR | 10-2004-0009358 | A | 1/2004 | WO | WO 2004/036661 | A1 | 4/2004 |
| KR | 10-2004-0015424 | A | 2/2004 | WO | WO-2004/053872 | A1 | 6/2004 |
| KR | 10-2004-0023126 | A | 3/2004 | WO | WO-2004/053874 | A1 | 6/2004 |
| KR | 10-2004-0023127 | A | 3/2004 | WO | WO-2004/059648 | A2 | 7/2004 |
| KR | 10-2004-0032674 | A | 4/2004 | WO | WO 2004/064064 | A1 | 7/2004 |
| KR | 10-2004-0065004 | A | 7/2004 | WO | 2004/068476 | A1 | 8/2004 |
| KR | 10-2004-0094301 | A | 11/2004 | WO | 2004/072963 | A1 | 8/2004 |
| KR | 1020040094301 | | 11/2004 | WO | WO-2004/068476 | A1 | 8/2004 |
| KR | 10-2004-0100702 | A | 12/2004 | WO | WO-2004/076730 | A1 | 9/2004 |
| KR | 10-2005-0057396 | A | 6/2005 | WO | WO-2004/077415 | A1 | 9/2004 |
| KR | 10-2005-0085444 | A | 8/2005 | WO | WO 2004/077420 | A1 | 9/2004 |
| KR | 100539509 | B1 | 2/2006 | WO | WO-2004/079631 | | 9/2004 |
| KR | 10-2006-0052789 | A | 5/2006 | WO | WO 2004/079729 | A1 | 9/2004 |
| KR | 10-0891107 | B1 | 3/2009 | WO | WO-2004/079729 | A1 | 9/2004 |
| RU | 2054203 | C1 | 2/1996 | WO | WO 2004/079731 | A1 | 9/2004 |
| RU | 2 174 716 | C2 | 10/2001 | WO | WO-2004/079731 | A1 | 9/2004 |
| RU | 2 192 673 | C2 | 11/2002 | WO | WO-2004/079740 | A1 | 9/2004 |
| RU | 2208844 | C2 | 7/2003 | WO | WO-2004/081922 | A1 | 9/2004 |
| RU | 2 223 556 | C2 | 2/2004 | WO | WO-2004/081926 | A1 | 9/2004 |
| RU | 2 228 547 | C2 | 5/2004 | WO | WO-2004/086379 | A1 | 10/2004 |
| RU | 2005 103 626 | | 9/2005 | WO | WO 2004/090890 | A1 | 10/2004 |
| RU | 2005 1237 337 | | 2/2006 | WO | WO-2004/093035 | A1 | 10/2004 |
| TW | 283232 | A | 4/1995 | WO | WO 2004/093065 | A1 | 10/2004 |
| TW | 302475 | A | 4/1997 | WO | WO-2004/100155 | A1 | 11/2004 |
| TW | 371752 | | 10/1999 | WO | WO 2004/100155 | A1 | 11/2004 |

| | | |
|---|---|---|
| WO | WO-2004/100156 A1 | 11/2004 |
| WO | 2004/105024 A1 | 12/2004 |
| WO | WO-2005/004123 A1 | 1/2005 |
| WO | WO 2005/004154 A2 | 1/2005 |
| WO | WO-2005/004154 A2 | 1/2005 |
| WO | WO 2005/006314-1 | 1/2005 |
| WO | WO 2005/006315 A1 | 1/2005 |
| WO | WO 2005/013265 A1 | 2/2005 |
| WO | WO-2005/013266 A-1 | 2/2005 |
| WO | WO 2005/013266 A1 | 2/2005 |
| WO | WO-2005/024792 A2 | 3/2005 |
| WO | WO-2005/062306 A1 | 7/2005 |
| WO | WO-2005/073971 A2 | 8/2005 |
| WO | WO 2005109432 A1 | 11/2005 |
| WO | WO 2005/124768 A1 | 12/2005 |
| WO | WO 2005/124774 A1 | 12/2005 |

OTHER PUBLICATIONS

Yokozeki, T. et al., "A Virtual Optical Disk Method to Realize Rewritability and Revision Control on a Write-Once Optical Disk", Systems and Computers in Japan, vol. 21, No. 8, 1990, pp. 34-43.

Taiwan Publication No. 448435-B, Publication Date Aug. 1, 2001 (abstract only).

Taiwan Publication No. 470946-B, Publication Date Jan. 1, 2002 (abstract only).

Taiwan Publication No. 497098-B, Publication Date Aug. 1, 2002 (abstract only).

ECMA: "120mm DVD Rewritable Disk (DVD-RAM)" Internet Citation Feb. 1, 1998, pp. 43-45, XP002518235.

ECMA: Standarizing Information and Communication Systems: "Standard ECMA-240: Data Interchange on 120mm Optical Disk Cartridges using Phase Change PD Format—Capacity:650Mbytes per cartridge" Standard ECMA 240, Jun. 1, 1996, pp. 41-53, XP002562014.

ECMA-238, pp. 54-61 XP-002289010, Jun. 1996.

Nick Parlante, "Linked List Basics" (Apr. 12, 2001) http://cslibrary.stanford.edu/103/LinkedListBasics.pdf.

* cited by examiner

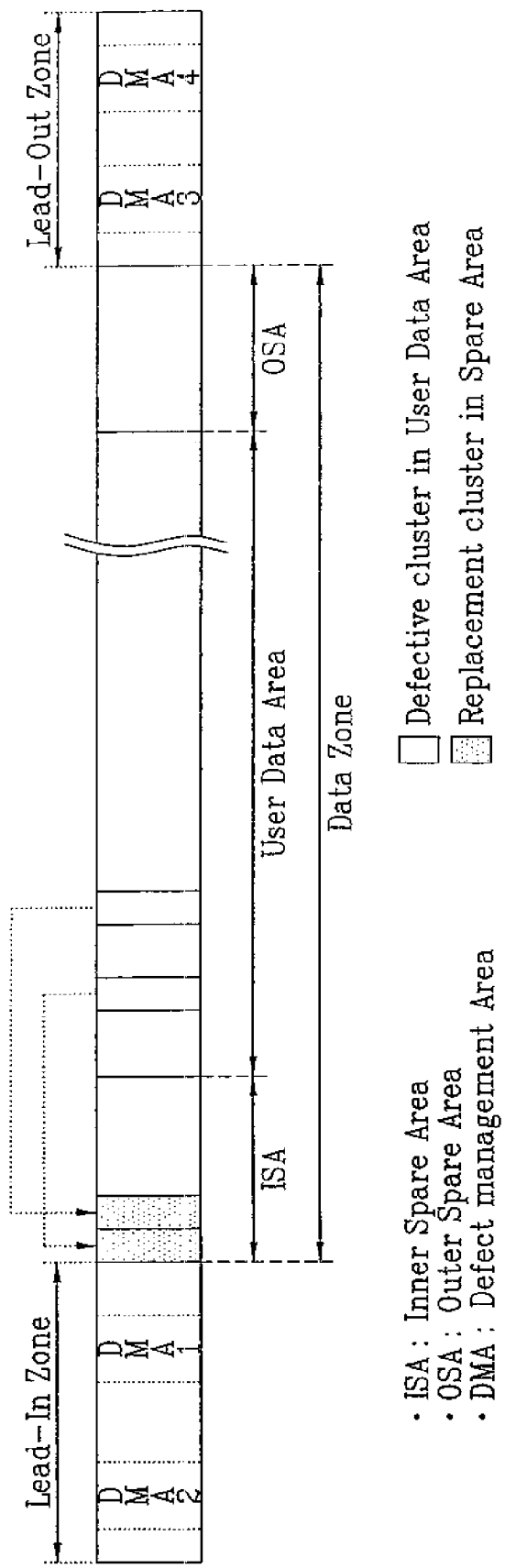

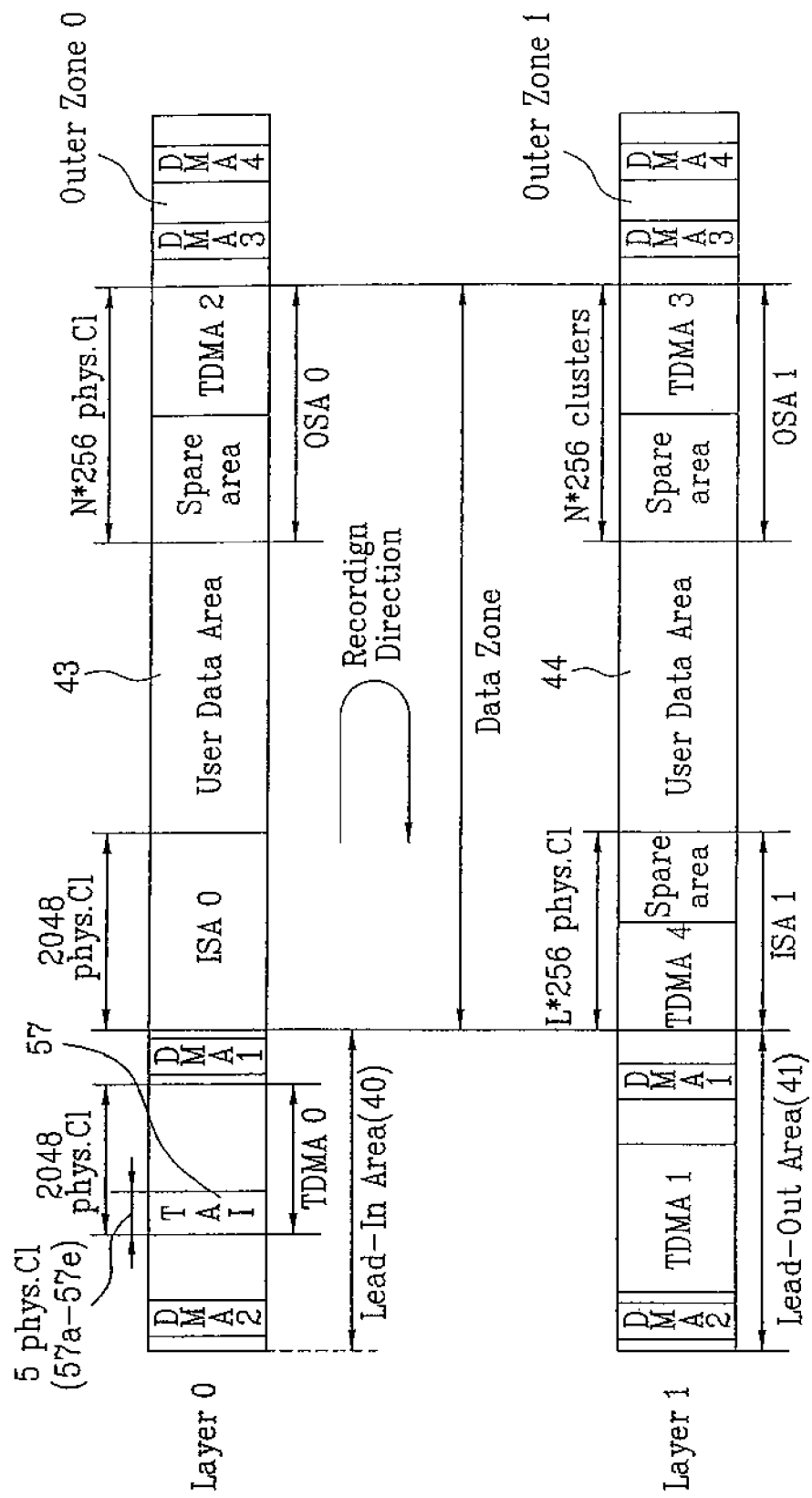

< Single Layer Disc >

< Dual Layer Disc >

< Single Layer Disc >

< Dual Layer Disc >

< Dual Layer Disc >

FIG. 5B

| Contents | number of bytes | |
|---|---|---|
| TDDS identifier = "DS" | 2 | ~61 |
| TDDS format = 00h | 1 | ~62 |
| TDDS Update Count | 4 | ~63 |
| first PSN of Drive Area(P_DA) | 4 | ~64 |
| first PSN of Defect List(P_DFL) | 4 | ~65 |
| Location of LSN 0 of User Data Area | 4 | ~66 |
| last LSN of User Data Area | 4 | ~67 |
| Inner Spare Area 0 size(ISA0_size) | 4 | ~68 |
| Outer Spare Area size(OSA_size) | 4 | ~69 |
| Inner Spare Area 1 size(ISA1_size) | 4 | ~70 |
| Spare Area Full flags | 1 | ~71 |
| Recording Mode | 1 | ~72 |
| general flag bits | 1 | ~73 |
| Inconsistency flags | 2 | ~74 |
| Last Recorded Address of User Data Area | 4 | ~75 |
| Size of TDMAs in Outer Spare Area | 4 | ~76 |
| Size of TDMA in Inner Spare Area 1 | 4 | ~77 |
| first PSN of 1th Cluster of Defect List(P_1th DFL) | 4 | ~78 |
| ⋮ | ⋮ | |
| first PSN of 8th Cluster of Defect List(P_8th DFL) | 4 | ~79 |
| first PSN of SRRI/SBM for L0(P_SRRI/P_SBM0) | 4 | ~80 |
| first PSN of SBM for L1(P_SBM1) | 4 | ~81 |
| next available PSN of ISA0(P_ISA0) | 4 | ~82 |
| next available PSN of OSA0(P_OSA0) | 4 | ~83 |
| next available PSN of ISA1(P_ISA1) | 4 | ~84 |
| next available PSN of OSA1(P_ISA1) | 4 | ~85 |
| Year/Month/Date of recording | 4 | ~86 |
| drive ID: Manufactures Name, | 48 | |
| Additional ID | 48 | ~87 |
| Unique serial number | 32 | |

Sector 31

< TDDS format >

| | contents | Number of Bytes | |
|---|---|---|---|
| Sector 0 | TLI identifier = "TL" | 2 | 92 |
| | TLI format = 00h | 1 | 93 |
| | TLI update count | 4 | 94 |
| | Latest TDDS location | 1 | 95 |
| | Set to 00h | M | 96 |
| Sector 1 | Latest TDDS | 2048 | 97 |
| Sector 2 ~ Sector 31 | Set to 00h (or Latest TDDS copied) | 30 * 2048 | 98 |

1 cluster 0000 0000 : TDMA 0
0000 0001 : TDMA 1
0000 0010 : TDMA 2
0000 0011 : TDMA 3
0000 0100 : TDMA 4

| | Sector 0 | First TDDS | |
|---|---|---|---|
| 1 Cluster | . | . | . |
| | . | . | . |
| | . | . | . |
| | Sector 31 | First TDDS | | first TDDS recorded 32 times

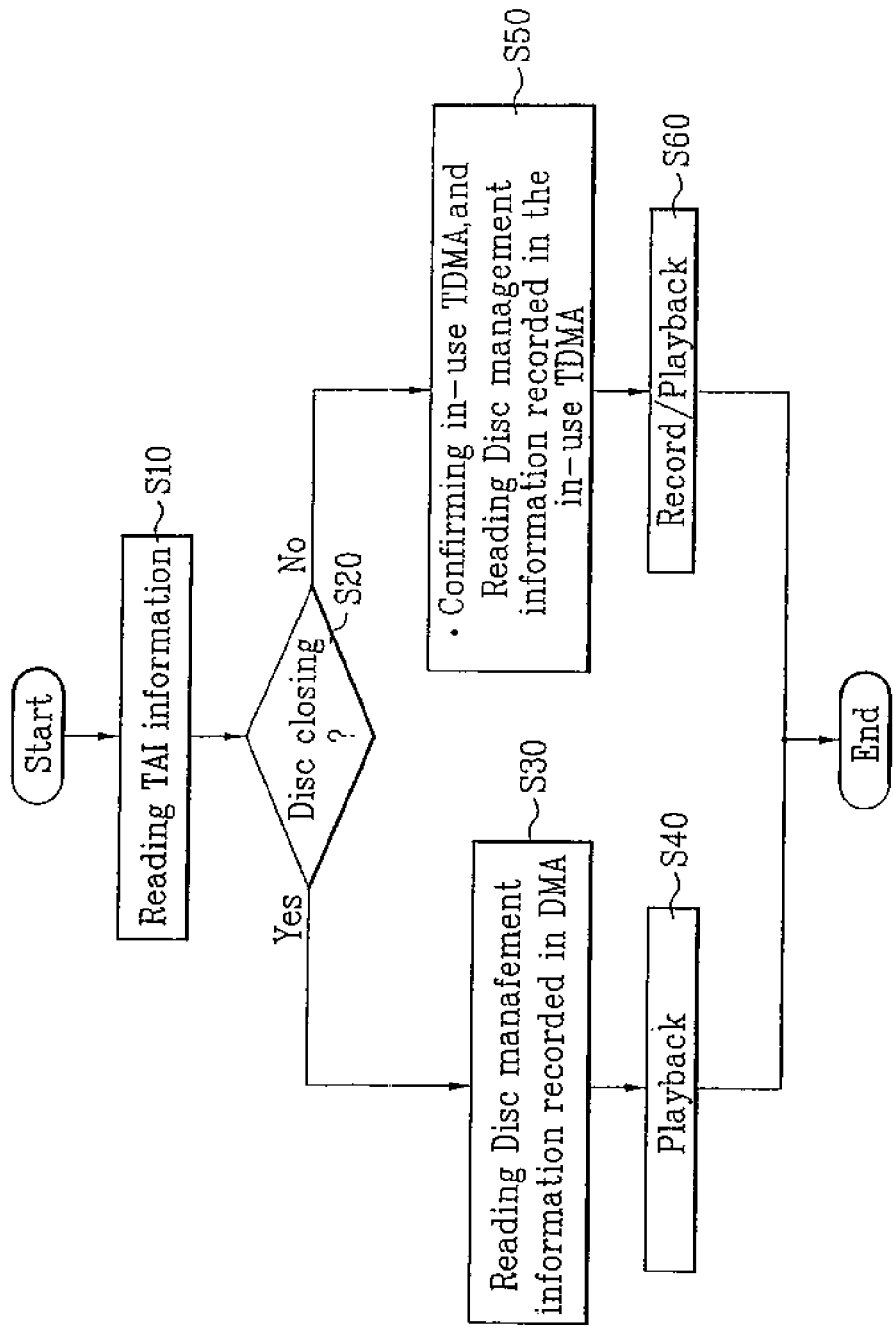

WRITE-ONCE OPTICAL DISC, AND METHOD AND APPARATUS FOR RECORDING/PLAYBACK MANAGEMENT INFORMATION ON/FROM OPTICAL DISC

This application is a Continuation of U.S. application Ser. No. 11/984,172, filed Nov. 14, 2007 now U.S. Pat. No. 7,672, 208 which is a Continuation of U.S. application Ser. No. 10/911,727, filed on Aug. 5, 2004, now U.S. Pat. No. 7,313, 065, which claims, under 35 U.S.C. §119, the priority benefit of Patent Application No. 2003-054165 filed in Republic of Korea on Aug. 5, 2003; Patent Application No. 2003-073088 filed in Republic of Korea on Oct. 20, 2003; Patent Application No. 2004-032677 filed in Republic of Korea on May 10, 2004, and U.S. Provisional Application No. 60/546,961 filed on Feb. 24, 2004. The entire contents of each of these applications are hereby incorporated by reference.

BACKGROUND OF THE INVENTION

1. Field of the Invention

The present invention relates to a write-once optical disc and an apparatus and method for recording/playing-back management information on/from the optical disc such as a Write-Once Blu-ray Disc (BD-WO).

2. Discussion of the Related Art

As an optical recording medium, optical discs on which high-capacity data can be recorded are widely being used. Among them, a new high-density optical recording medium (HD-DVD), for example, a Blu-ray disc, has been recently developed for recording and storing high-definition video data and high-quality audio data for a long-term period.

The Blu-ray disc involves the next generation HD-DVD technology and is the next generation optical recording solution, which has an excellent capability to store data more than existing DVDs. Recently, a technical specification of an international standard for HD-DVD has been established. Various standards for Blu-ray discs are being prepared. Particularly the standards for a write-once Blu-ray disc (BD-WO) are being proposed.

FIG. 1 schematically illustrates the structure of a recording area of a rewritable Blu-ray disc (BD-RE) according to a related art. As shown in FIG. 1, the disc is divided into a lead-in zone, a data zone and a lead-out zone allocated in the inner-to-outer radius direction. The data zone is provided with an inner spare area (ISA) and an outer spare area (OSA) respectively disposed at the inner and outer radiuses to replace defective areas, and a user data area provided between the spare areas to record user data therein.

If a defective area is generated in the user data area while data is recorded on the rewritable Blu-ray disc (BD-RE), data is transferred from the defective area to the spare area and is recorded in a portion of the spare area. This portion of the spare area is known as a replacement area for replacing the defective area. Additionally, position information related to the defective area, that is, position information on the defective area and on the corresponding replacement area is recorded in defect management areas (DMA1, DMA2, DMA3, and DMA4), which are provided in the lead-in/out zones, to perform defect management. The BD-RE has a cluster as a minimal recording-unit. One cluster has a total of 32 sectors, and one sector has 2048 bytes.

Since rewriting can be performed in any area of the BD-RE, the entire area of the disc can be randomly used irrespective of a specific recording manner. Also, since the defect management information can be written, erased and rewritten in the defect management areas (DMAs), it does not matter that the size of the defect management area is small in particular, the BD-RE allocates and uses 32 clusters for each of the defect management areas (DMAs).

On the other hand, in a write-once disc such as a BD-WO, writing can be only made once in a specific area of the disc and thus, the manner of recording is much limited. As such, defect management becomes one of the important matters when data is to be recorded on a high-density write-once disc such as a BD-WO. Accordingly, the write-once disc requires a management area to record therein information on defect management and on disc management. In this regard, the write-once optical disc requires a larger management area for recording information on the defect management and on the disc use state due to its unique 'write-once' characteristic.

However, a unified standard satisfying the above requirements is not available for a write-once disc such as a BD-WO. Further, any standard related to presently declared write-once optical discs cannot solve the above drawbacks.

SUMMARY OF THE INVENTION

Accordingly, the present invention is directed to a write-once optical disc, and an apparatus and method for recording/ playing back management information on/from the optical disc that substantially obviate one or more problems due to limitations and disadvantages of the related art.

An object of the present invention is to provide a method and apparatus for separately recording and managing management information on a write-once disc, thereby enhancing the use efficiency of a plurality of temporary disc/defect management areas (TDMAs) provided on the disc.

Another object of the present invention is to provide a method and apparatus for efficiently recording and playing back an optical disc using management information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a recording medium comprising: at least one recording layer; a plurality of temporary defect management areas (TDMAs) on the at least one recording layer; and a plurality of defect management areas DMAs) on the at least one recording layer, wherein at least one of the TDMAs includes first and second indicators, the first indicator indicating which TDMA is an in-use TDMA, and the second indicator indicating whether or not the recording medium is closed.

In another aspect of the present invention, there is provided a recording medium comprising: at least one recording layer; a plurality of temporary management areas on the at least one recording layer; and a plurality of defect management areas (DMAs) on the at least one recording layer, wherein at least one of the temporary management areas includes a DMA access indicator indicating whether or not the recording medium is closed.

In a further another aspect of the present invention, there is provided a method of recording management information on a recording medium, the recording medium including a plurality of temporary defect management areas (TDMAs) on at least one recording layer, and a plurality of defect management areas (DMAs) on the at least one recording layer, the method comprising: recording first and second indicators in at least one of the TDMAs, the first indicator indicating which TDMA is an in-use TDMA, and the second indicator indicating whether or not the recording medium is closed.

In a further another aspect of the present invention, there is provided a method of recording management information on a recording medium, the recording medium including a plurality of temporary management areas on at least one recording layer, and a plurality of defect management areas (DMAs) on the at least one recording layer, the method comprising: recording, in at least one of the temporary management areas, a DMA access indicator indicating whether or not the recording medium is closed.

In a further another aspect of the present invention, there is provided a method of quickly accessing a recording medium, the method comprising: reading TDMA (temporary disc management area) access indicator (TAI) information from a loaded recording medium; determining whether or not the recording medium is closed based on the TAI information; and accessing management information from an in-use-TDMA based on the TAI information, if the determining step determines that the recording medium is not closed.

In a further another aspect of the present invention, there is provided an apparatus for providing management information on a recording medium, the recording medium including a plurality of temporary defect management areas (TDMAs) on at least one recording layer, and a plurality of defect management areas (DMAs) on the at least one recording layer, the apparatus comprising: a recording part to record first and second indicators in at least one of the TDMAs, the first indicator indicating which TDMA is an in-use TDMA, and the second indicator indicating whether or not the recording medium is closed.

In a further another aspect of the present invention, there is provided an apparatus for providing management information on a recording medium, the recording medium including a plurality of temporary management areas on at least one recording layer, and a plurality of defect management areas (DMAs) on the at least one recording layer, the apparatus comprising: a recording part to record, in at least one of the temporary management areas, a DMA access indicator indicating whether or not the recording medium is closed.

In a further another aspect of the present invention, there is provided an apparatus for quickly accessing a recording medium, the apparatus comprising: a pickup unit; and a controller controlling the pickup unit to read TDMA (temporary disc management area) access indicator (TAI) information from a loaded recording medium, determining whether or not the recording medium is closed based on the TAI information, and accessing management information from an in-use-TDMA based on the TAI information if the recording medium is determined to be not closed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a schematic view illustrating the structure of a rewritable Blu-ray disc according to a related art;

FIGS. 2A and 2B are views respectively illustrating the structure of a single-layer write-once optical disc and the structure of a dual-layer write-once optical disc according to an embodiment of the present invention;

FIG. 5B is a view illustrating a structure of a TDDS according to all embodiment of the present invention;

FIG. 8 is a flow chart illustrating an optical recording/playback method using an optical recording/reproducing apparatus according to an embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

For description convenience, a write-once optical disc is exemplified as a write-once Blu-ray disc (BD-WO).

Figure 2A:
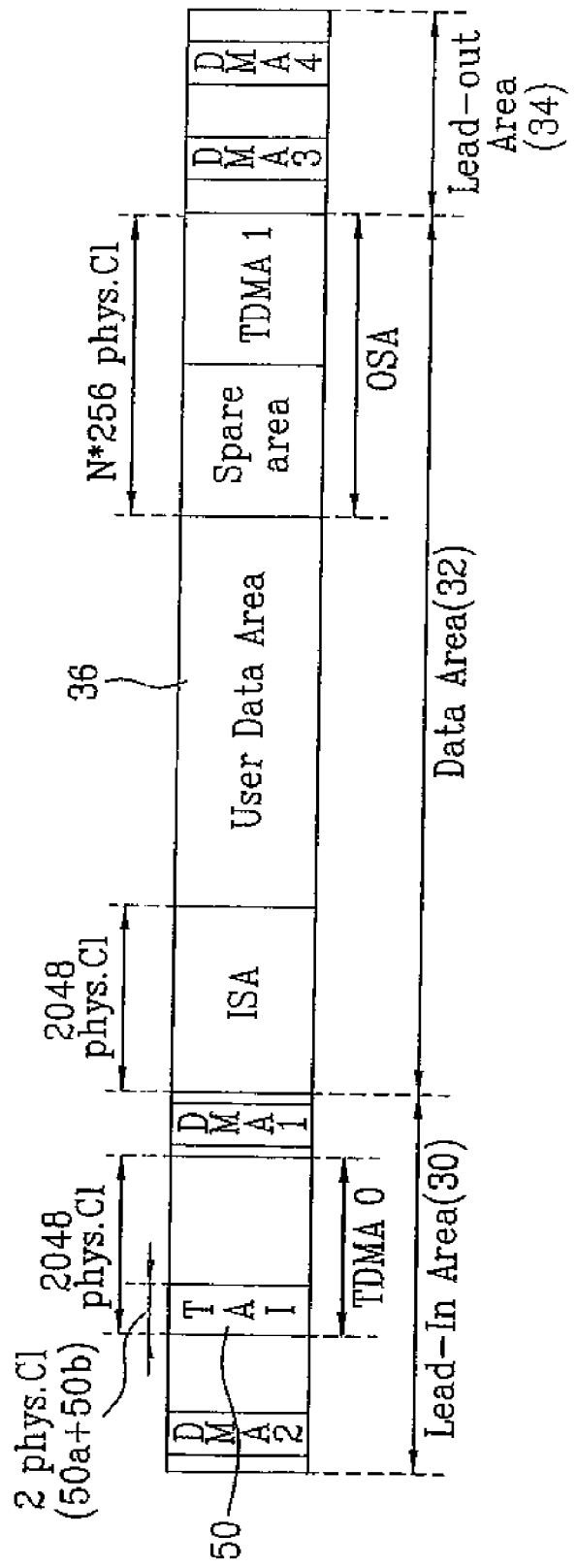

FIGS. 2A and 2B are views illustrating the structure of a write-once optical disc such as a BD-WO and a method for recording management information on the disc according to an embodiment of the present invention. Particularly, FIG. 2A illustrates a single-layer write-once optical disc having one recording layer according to an embodiment of the present invention. FIG. 2B illustrates a dual-layer write-once optical disc having two recording layers according to an embodiment of the present invention.

As shown in FIG. 2A, the single-layer optical disc includes a lead-in area 30, a data area 32 and a lead-out area 34 in the inner-to-outer radius direction. The data area 32 includes an inner spare area (ISA) and an outer spare area (OSA) for replacing defective areas, and a user data area for recording user data therein. The write-once optical disc also includes a plurality of temporary disc/defect management areas TDMAs in addition to a plurality of disc/defect management areas (DMAs). The DMAs (DMA1-DMA4) are provided in the lead-in and lead-out areas 30 and 34. The TDMAs store temporarily management information whereas the DMAs store more permanently the management information. For instance, when the disc is to be finalized or closed, the management information stored in a TDMA is transferred to and stored in each of the DMAs. The same information is repeatedly stored four times using the plurality of DMAs.

Here, two TDMAs are provided on the disc, and are referred to as a TDMA0 and a TDMA1. The TDMA0 having a fixed size (for example, 2048 clusters) is located in the lead-in area 30, and the TDMA1 having a variable size is provided in the spare area OSA having a variable size. The TDMA0 should be necessarily provided on the disc, whereas the TDMA1 is selectively allocated with various sizes, appropriately. For instance, the size of the TDMA1 can be ¼ of the size (N*256 clusters) of the OSA such that P=(N*256/4) clusters where P=size of the TDMA1 and N is a positive integer.

Further, the plurality of TDMAs are used in a specific use sequence. For instance, it is used in a sequence of the TDMA0 and then the TDMA1. Identification numbers (TDMA0 and TDMA1) are given to the TDMAs in a serial sequence depending on the use sequence.

According to an embodiment of the present invention, management information for managing the plurality of TDMAs is recorded at the head of the TDMA0. This TDMA management information is referred to herein as a TDMA access indicator (TAI), e.g., element 50 in FIG. 2A. The TAI can also be referred to as a TLI (TDMA location indicator). The TAI identifies which TDMA among all the TDMAs to be used in a specific use sequence/order, is an "in-use TDMA". An "in-use TDMA" is a TDMA that is currently being used/accessed or that is currently available for use, among all the TDMAs having the designated use sequence. The TAI also provides information on whether or not the disc is currently closed/finalized.

The TAI allows an initial disc access time to be reduced greatly since the TAI identifies the in-use TDMA and thus, information on the last defect management and on the disc use state can be quickly obtained from the identified in-use TDMA. This is beneficial especially when the disc is initially loaded. Without the TAI, all the TDMAs have to be scanned to determine which TDMA is the in-use TDMA in order to obtain the necessary management information from that in-use TDMA.

In the single-layer write-once disc of FIG. 2A, the TAI 50 is provided by first two head clusters 50a and 50b among the fixed 2048 clusters of the TDMA0.

On the other hand, as shown in FIG. 2B, the dual-layer writer-once optical disc includes a first recording layer (Layer 0) and a second recording layer (Layer 1). The first recording layer (Layer 0) includes a lead-in area 40 and an outer zone 0 respectively at the inner and outer radius areas of the disc. The second recording layer (Layer 1) includes a lead-out area 41 and an outer zone 1 respectively at the inner and outer radius areas of the disc. The lead-in and lead-out areas 40 and 41 are known as inner zones.

Further, the disc includes a data area 42 on each of the recoding layers. The data area of the first recording layer (Layer 0) includes inner and outer spare areas ISA0 and OSA0, and a user data area 43 therebetween. The user area of the second recording layer (Layer 1) includes inner and outer spare areas ISA1 and OSA1 and a user data area 44 therebetween. The ISA0 has a fixed size such as 2048 clusters. The ISA1, OSA0 and OSA1 have variable sizes. For instance the size of the ISA1 may be (L*256) clusters and the size of each of the OSA0 and OSA1 may be (N*256) clusters where L and N are positive integers. The disc also includes a plurality of DMAs (DMA1-DMA4) in the lead-in area 40, the outer zones 0, 1 and the lead-out area 41. The same information is repeatedly recorded in the DMAs for the redundancy purpose.

Furthermore, the disc includes a plurality of TDMAs (TDMA0, TDMA1, TDMA2, TDMA3 and TDMA4) in addition to the DMAs. The TDMA0 and the TDMA1 exist in the lead-in and lead-out areas 40 and 41 (inner zones) and have fixed sizes (e.g., 2048 clusters). The TDMA2, the TDMA3 and the TDMA4 are provided with variable sizes that vary according to the variable sizes of the corresponding spare areas. For instance, the size of each of the TDMA2, TDMA3 and TDMA4 can be ¼ of the size of the corresponding spare area. In one example, the TDMA2 and the TDMA3 each have the size of P=N*256/4 clusters, and the TDMA4 has the size of Q=L*25614 clusters.

Moreover, all the TDMAs are used in a specific use sequence. For instance, the TDMA0-TDMA4 are used in the sequence of the TDMA0 to TDMA4. This means, whenever recording is desired to a TDMA, the TDMA0 is first used to record therein. When the TDMA0 is full, i.e., fully used up, then the TDMA1 is next used to record therein. When the TDMA1 is full, then the TDMA2 is next used to record therein, and so on. Identification numbers (TDMA0 to TDMA4) are given to the TDMAs in a serial sequence depending on the use sequence.

As in the single-layer write-once disc of FIG. 2A, the dual-layer optical disc of FIG. 2B also includes a TAI 57 at the head area of the TDMA0 preferably located in the lead-in area 40 of the disc. Generally since more TDMAs are provided on the dual-layer optical disc compared to the single-layer disc, providing the TAI on the dual-layer optical disc is of great importance.

In the dual-layer optical disc, the TAI is represented by first five head clusters 57a-57e among the fixed 2048 clusters of the TDMA0.

Figure 3A:
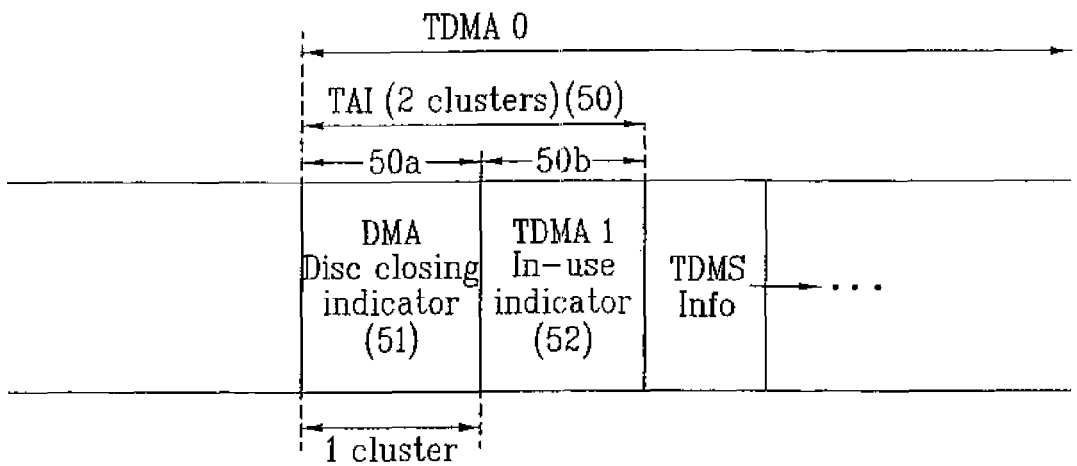
FIGS. 3A-3E are views illustrating the structure of a TAI and a method for recording and using the TAI for a single-layer write-once optical disc and a dual-layer write-once optical disc according to an embodiment of the present invention.
Figure 3B:
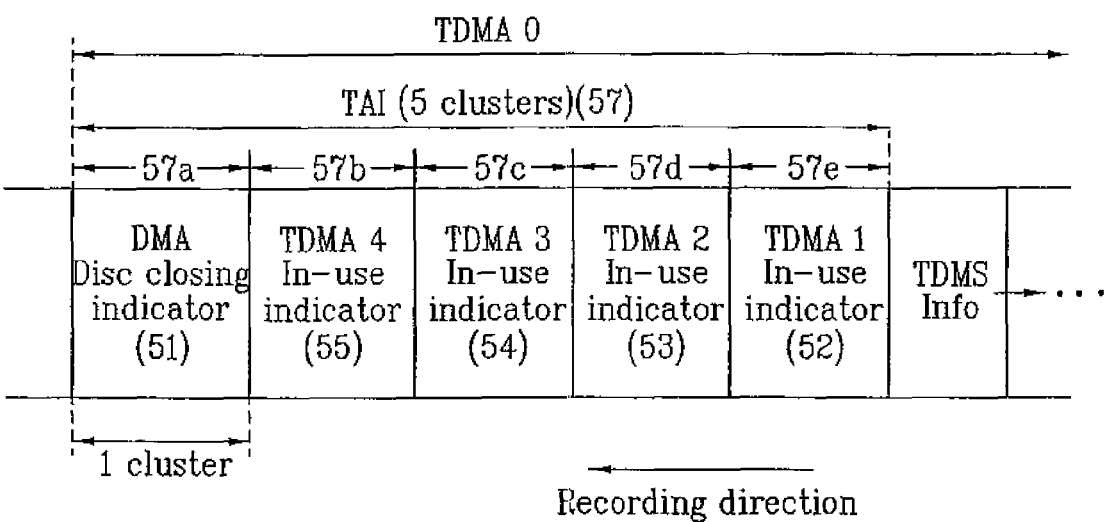

FIGS. 3A to 3B are views illustrating the structure of a TAI according to an embodiment of the present invention. FIG. 3A illustrates the structure and use of a TAI in a single-layer write-once optical disc such as a single-layer BD-WO, and FIG. 3B illustrates the structure and use of a TAI in a dual-layer write-once optical disc such as a dual-layer BD-WO. The structures of the TAI as shown in FIGS. 3A and 3B are applicable to the discs shown in FIGS. 2A and 23.

As shown in FIG. 3A, in the single-layer write-once optical disc, the TAI 50 is composed of the first two head clusters 50a and 50b of the TDMA0 on the disc. One of the two TAI clusters 50a and 50b is used as a DMA disc closing indicator 51 for informing whether or not the optical disc is finalized/closed, and the other one of the two TAI clusters 50a and 50b cluster is used as a TDMA1 in-use indicator 52 for indicating whether or not the TDMA1 is the in-use TDMA. In this example, the first head cluster 50a of the TAI 50 functions as the DMA disc closing indicator 51, and the second head cluster 50b functions as the TDMA1 in-use indicator. However, this allocated order can be switched as needed.

The TDMA1 in-use indicator 52 indicates directly whether or not the corresponding TDMA1 is the in-use TDMA. This indication is implemented by providing certain recording in the second cluster 50b of the TAI 50. If the TAI cluster 50b has this certain recording therein, then the TAI cluster 50b is said to be in the 'recorded state'. If the TAI cluster 50b does not have this certain recording therein, then the TAI cluster 50b is said to be not in the recorded state. If the TAI cluster 50b (the TDMA1 in-use indicator 52) is not in the recorded state, it means that the firstly used TDMA0 is the in-use-TDMA. If the TAI cluster 50b is in the recorded state, it means that the next TDMA1 is the in-use-TDMA, which means the firstly used TDMA0 is full, i.e., fully used up, so that there is no recording space in the TDMA0.

Accordingly, by examining the recorded/unrecorded state of the TAI cluster 50b, a recording/reproducing apparatus can identify quickly which TDMA can and should be currently used during a data recording operation of the disc. This reduces the disc access time greatly and provides an efficient and effective way to carry data recording operations of the disc.

The DMA disc closing indicator 51 functions to inform whether or not the write-once optical disc is closed/finalized. This can be realized by recording certain data in the first cluster 50*a* of the TAI. If there is such recording in the first TAI cluster 50*a*, then the first TAI cluster 50*a* is said to be in the recorded state and the recorded state of the first TAI cluster 50*a* means the disc is finalized/closed. If there is no such recording in the first TAI cluster 50*a*, then the first TAI cluster 50*a* is said to be not in the recorded state, which in turn means the disc is not yet finalized/closed.

A user or host can request the disc to be closed, or the closing of the disc can be triggered automatically if there is no user data area or management data area to record user data/management data therein. Once the disc is closed, the disc is essentially in a read-only state, thereby making it impossible to record user data subsequently. The closing of the disc is also referred to as finalizing the disc or disc finalization.

If the disc is to be closed as described above, the optical recording/playback apparatus transfers and records the latest management information from the latest TDMA into each of the DMAs. At this time, the first TAI cluster 50*a* (DMA disc closing indicator cluster 51) is recorded with data (e.g., dummy data or some other data) to be placed in the recorded state. The recorded state of the first TAI cluster 50*a* indicates that the disc is closed.

Figure 3C:
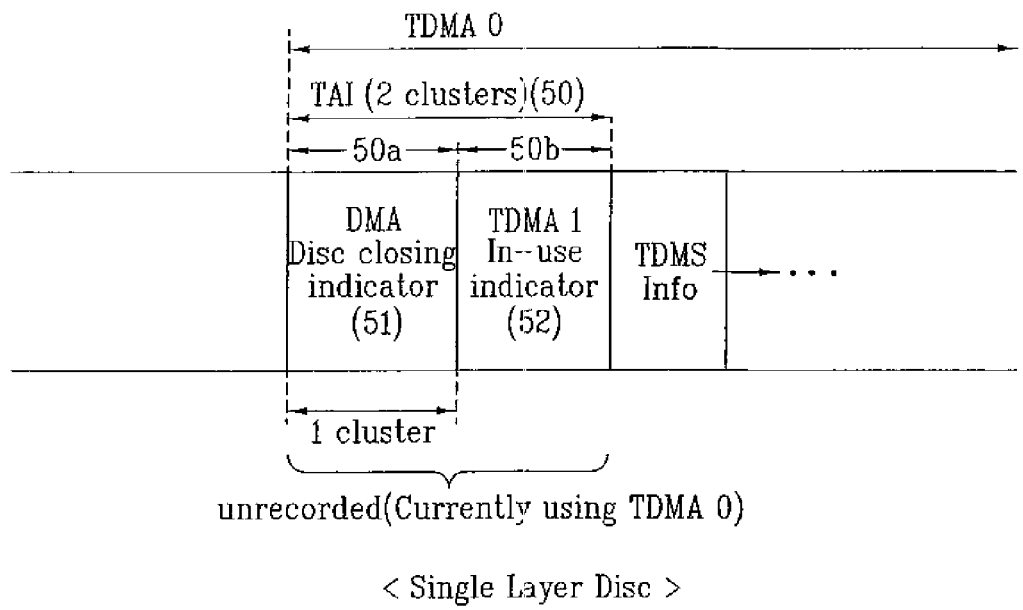

As shown in FIG. 3C, if none of the TAI clusters 50*a* and 50*b* are in the recorded state, it means that the in-use-TDMA is the TDMA0 as the first TDMA and the disc is not closed.

Placing the TAI clusters 50*a* and 50*b* in the recorded state is done by recording the TAI clusters 50*a* and 50*b* with some data. This can be realized by recording the TAI clusters 50*a* and 50*b* with high frequency signals, dummy data, or real data (meaningful data). For instance, the latest temporary disc definition structure (TDDS) information of the corresponding TDMA can be recorded into the corresponding TAI cluster as an example of using real data to place the TAI cluster in the recorded state. Examples of recording such real data in the TAI clusters will be described later reference to FIGS. 6A and 6B.

Accordingly, the TAI includes the disc closing information as well as information on the in-use-TDMA among the TDMAs.

According to an embodiment of the present invention, the dual-layer disc can have up to five TDMAs (TDMA0-TDMA4). Then the TAI for such a disc is composed of the first five head clusters of the TDMA0, where the first head cluster of the TDMA0 functions as the DMA disc closing indicator and the next four head clusters (second to fifth clusters) of the TDMA0 function as the TDMA in-use indicators. The second to fifth clusters of the TDMA0 correspond respectively to the TDMA1-TDMA4 such that they function as the TDMA1-TDMA4 in-use indicators, respectively. Each of these TDMA in-use indicators, as discussed in connection with FIG. 3A, indicates whether or not the corresponding TDMA is the in-use TDMA.

FIG. 3B illustrates an example of the structure of a TAI 57 for the dual-layer write-once disc of FIG. 2B according to an embodiment of the present invention. As shown in FIG. 3B, the TAI 57 is composed of first to fifth head clusters 57*a*-57*e* of the TDMA0. The first TAI cluster 57*a* functions as a DMA disc closing indicator 51. The second to fifth TAI clusters 57*b*-57*e* function respectively as TDMA4-TDMA1 in-use indicators 55-52. As such, the second to fifth TAI clusters 57*b*-57*e* are used in the order of decreasing address, which is indicated by the 'recording direction' arrow. That is, recording in the TAI clusters 57*b*-57*e* occurs sequentially from the cluster 57*e* to the cluster 57*b*. However, these clusters can be used in the reverse direction.

Figure 3D:
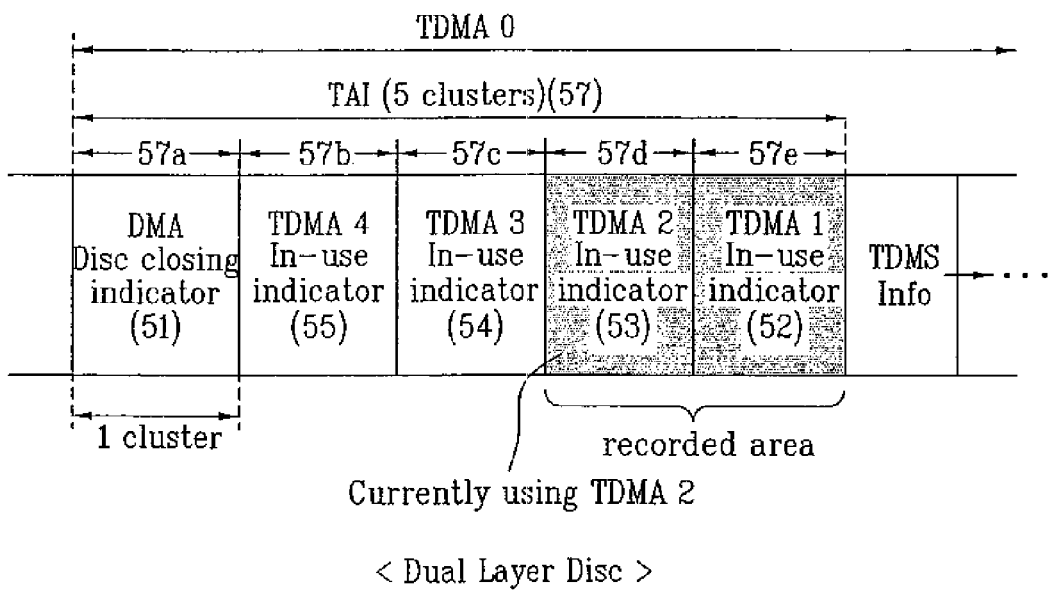

If none of the second to fifth TAI clusters 57*b*-57*e* are in the recorded state, it means that the firstly used TDMA0 is the in-use-TDMA. If the fifth TAI cluster 57*e* (TDMA1 in-use indicator 52) alone is in the recorded state, it means that the TDMA0 is full and the TDMA1 is the in-use-TDMA. If only the fifth and fourth TAI clusters 57*e* and 57*d* are in the recorded state, it means that the TDMA0 and TDMA1 are full and the TDMA2 is the in-use-TDMA. This is illustrated in FIG. 3D. The rest of the in-use indicator clusters are used in the similar manner.

Figure 3E:
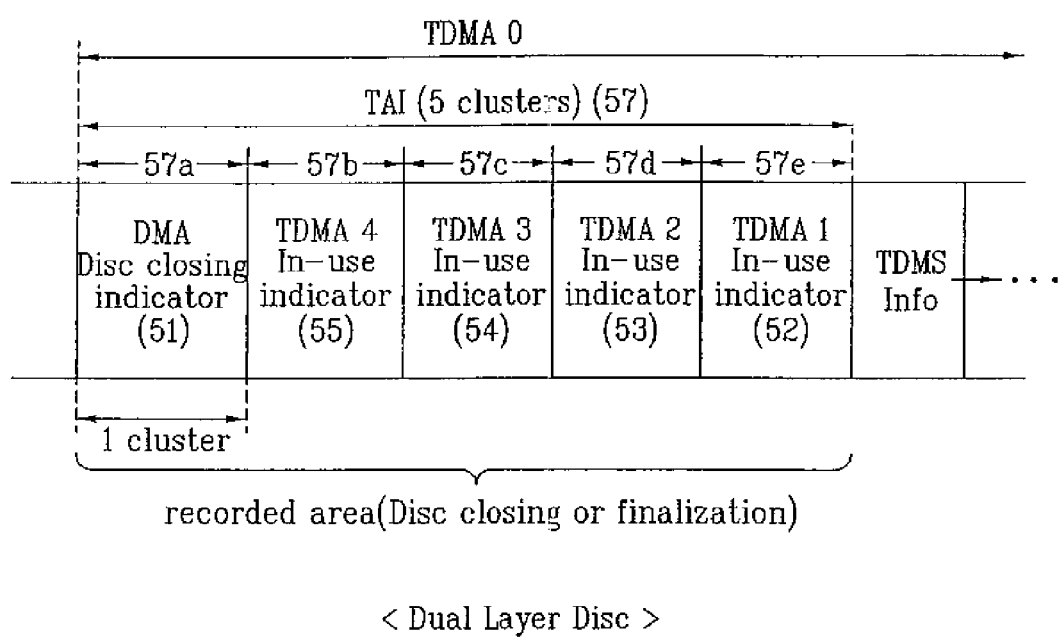

If all the clusters 57*a*-57*e* of the TAI 57 are in the recorded state as shown in FIG. 3E, it means that the current disc is closed, and no data can now be recorded on any area of the disc. Thus, only a reproduction of the disc may be allowed.

Figure 4A:
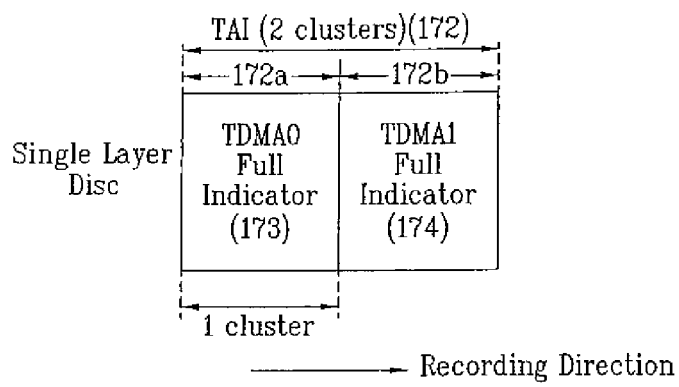
FIGS. 4A-4C are views illustrating the structure of a TAI and a method for recording and using the TAI for a single-layer write-once optical disc and a dual-layer write-once optical disc according to another embodiment of the present invention.
Figure 4B:
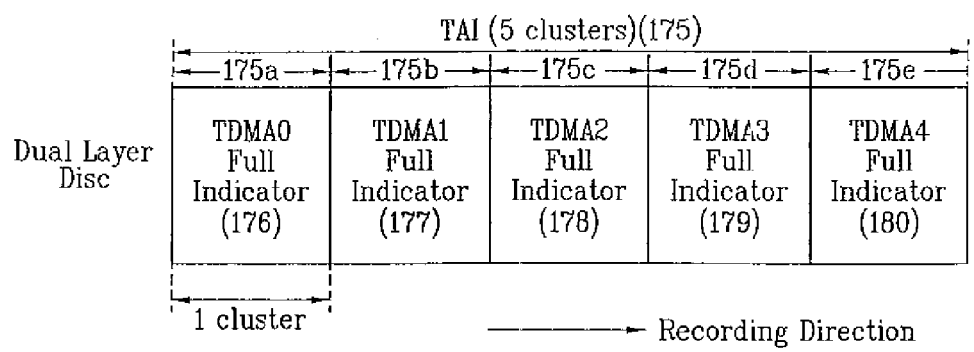
Figure 4C:
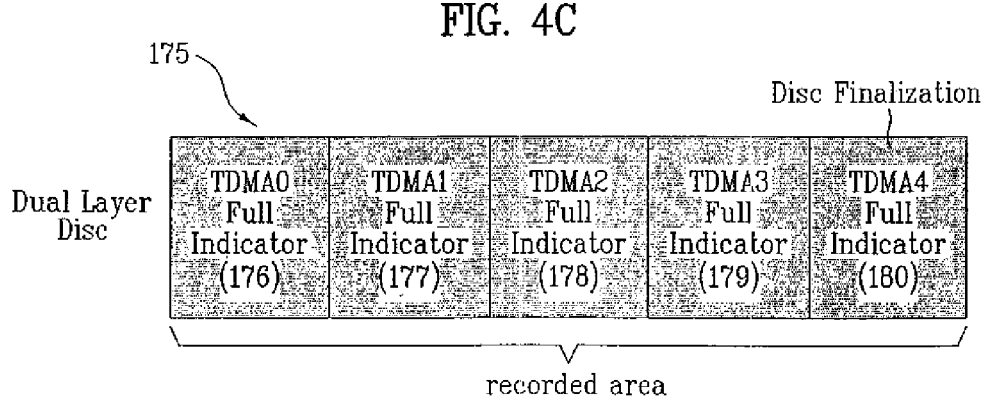

FIGS. 4A to 4C are views illustrating the structure of a TAI according to another embodiment of the present invention. FIG. 4A illustrates the structure and use of a TAI in a single-layer write-once optical disc such as a single-layer BD-WO, and FIGS. 4B and 4C illustrate the structure and use of a TAI in a dual-layer write-once optical disc such as a dual-layer BD-WO. The structures of the TAI as shown in FIGS. 4A-4C are applicable to the discs and TAI (57) shown in FIGS. 2A and 2B.

In this embodiment, the TAI indicates which TDMA is the in-use TDMA by indicating which TDMA(s) are full. In the example of FIGS. 4A-4C, assume that the TDMAs are used sequentially from the TDMA0 to the TDMA1 (single-layer disc), or to the TDMA4 (dual-layer disc) as discussed above. Also the TAI is used in a sequence starting from the TAI cluster having a low PSN to the TAI cluster having a high PSN.

As shown in FIG. 4A, in the example of the single-layer disc, two clusters 172*a* and 172*b* are allocated for a TAI 172. The first and second TAI clusters 172*a* and 172*b* function respectively as a TDMA0 full indicator 173 and a TDMA1 full indicator 174. Accordingly, if only the TDMA0 is full, the first TAI cluster 172*a* (TDMA0 full indicator 173) alone is indicated as being in the recorded state. This means that the TDMA1 is the in-use TDMA and can be used. If the first TAI cluster 172*a* is not in the recorded state, it means that the TDMA0 is not yet full and is available for use. That is, the TDMA0 is the in-use TDMA and can be used. If both the first and second TAI clusters 172*a* and 172*a* are in the recorded state, then the TDMA0 and TDMA1 are all full, which means there is no TDMA available for recording management information and the disc is closed/finalized.

As shown in FIG. 4B, in the dual-layers write-once disc, first through fifth clusters 175*a*-175*e* are allocated for a TAI 175 and are recorded sequentially in that order in this example. The first to fifth cluster 175*a*-175*e* correspond to the TDMA0 to TDMA4, respectively, and function as TDMA0-TDMA4 full indicators 176-180, respectively. Each TAI cluster indicates whether or not the corresponding TDMA if full.

Accordingly, for instance, if no TAI cluster is in the recorded state, it means that the TDMA0 is the in-use TDMA. If only the first TAI cluster 175*a* is in the recorded state, it means that the TDMA0 is full and the in-use-TDMA is the TDMA1. If only the first and second TAI clusters 175*a* and 175*b* are in the recorded state, it means that the TDMA0 and TDMA1 are fully used and the TDMA2 is currently available for use. If all five TAI clusters 175*a*-175*e* are in the recorded state as shown in FIG. 4C, it means that the TDMA0 to the TDMA4 are all fully used up and there is no usable TDMA. In this case, since the corresponding disc has no area for recording the TDMS information therein, the disc is finalized/closed.

In the embodiment of FIGS. 4A-4C, the TDMA full indicators of the TAI can be used to determine whether or not the disc is finalized/closed and thus can function also as the disc closing indicator. For instance, if the TAI cluster 174 (TDMA1 full indicator) in the example of FIG. 4A is in the recorded state, it means that the disc is closed/finalized. In the example of FIG. 4C, if the TAI cluster 180 (TDMA4 full indicator) is in the recorded state, it means that the disc is closed/finalized.

According to the embodiments of the present invention, the TAI clusters shown in FIGS. 3A-4C can be used sequentially in the order of decreasing address or increasing address. However, it may be desirable that the recording of the TAI clusters is performed in a sequence starting from the cluster having a high PSN (Physical Sector Number) to the cluster having a lower PSN, as shown in FIG. 3B. This prevents interference with an OPC (Optimum Power Calibration, not shown) disposed in the inner radius direction adjacently to the TDMA0.

According to the present invention, since the recording/reproducing apparatus checks for a recorded state within the TAI to determine the location of the in-use-TDMA if the disc is loaded, the recording/reproducing apparatus can quickly move to a start location of the in-use-TDMA to read the lastly recorded TDMS (temporary disc management structure) information there from, thereby initially obtaining a variety of initialization information for playback. However, if there is no TAI, the recording/reproducing apparatus has to scan all TDMAs beginning from the TDMA0 to search for an available TDMA. This is a drawback because a long disc access time is needed for initial playback. Thus the present invention solves the above drawback effectively by providing and using the TAI. Moreover, the DMA disc closing indicator of the TAI quickly indicates whether or not any recording can be made to the disc.

According to an embodiment of the present invention, if the single-layer write-once disc has more than two TDMAs or if the dual-layer write-once disc has a certain number of TDMAs, then the total number of TAI clusters present in the TAI as the TDMA in-use indicators changes according to the total number of TDMAs present on the disc. For instance, if there is an X number of TDMAs on the disc, then there is an (X−1) number of TAI clusters that function as the TDMA in-use indicators. Each of such TAI clusters would correspond to one of the TDMAs, generally excluding the first TDMA (TDMA0), in the order of the TDMA use sequence.

The TAI 50, 57, 172, 175 is located at the head of the TDMA0 located in the lead-in area of the single layer or dual-layer disc as shown in FIGS. 2A and 2B. However, any location of the TAI on the disc is acceptable if it is located within an area which a recording/reproducing apparatus can initially recognize as the management area. In this regard, the data area of the disc may be excluded. For instance, the TAI can alternatively be provided at the end portion of the TDMA0. As another alternative, the TAI can be provided within one, some or each of the DMAs of the single-layer/dual-layer write-once disc.

Figure 5A:
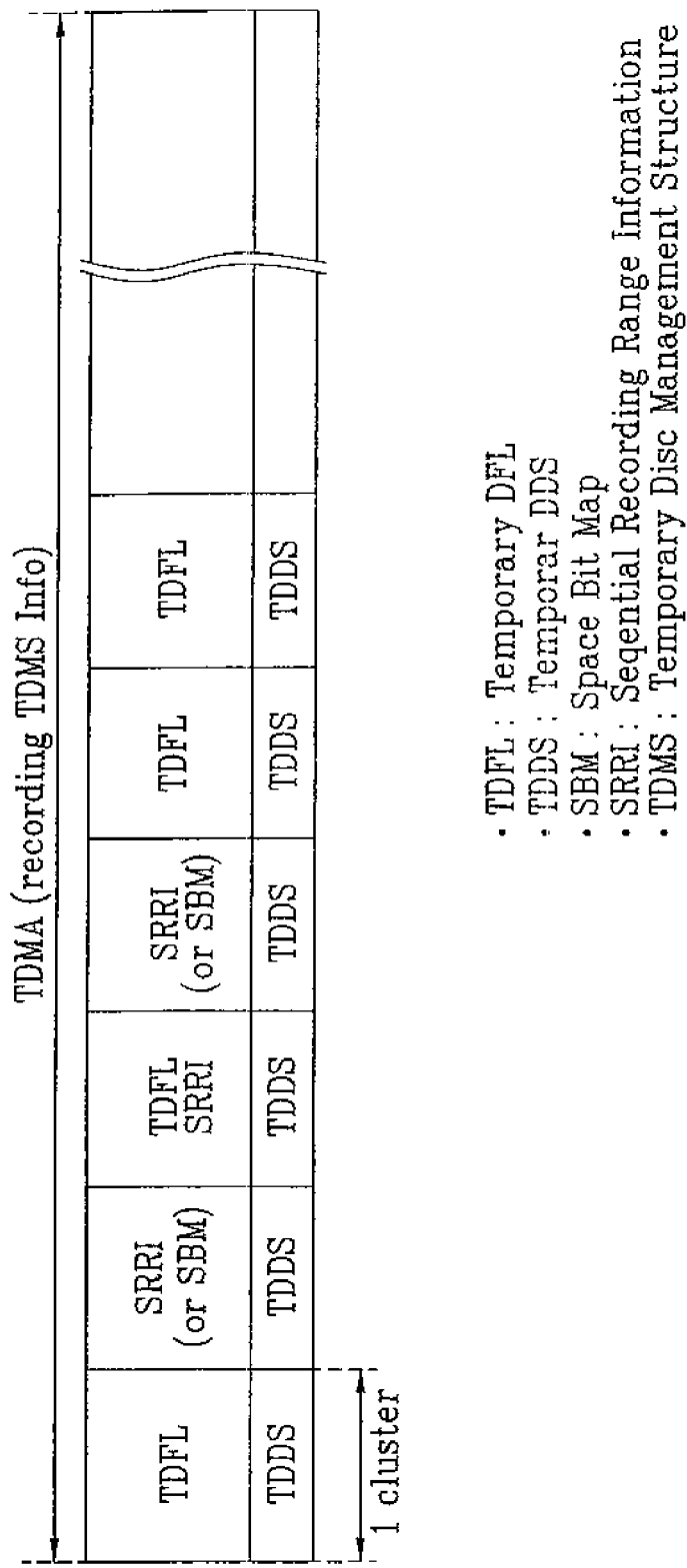
FIG. 5A is a view illustrating a variety of disc defect management and disc use state information recorded in a TDMA according to an embodiment of the present invention.

FIG. 5A illustrates a variety of information on the disc defect management and on the disc use state, where this information is recorded in the TDMAs. Whenever recording is performed on the disc, the recording is generally performed by more than one cluster, a cluster being generally a minimal recording-unit. Various disc management information recorded in the TDMA (e.g., TDMA0, TDMA1, TDMA2, TDMA3, or TDMA4) is collectively referred to herein as TDMS (temporary disc management structure) information. The TDMS information can be changed or added depending on a standard.

As shown in FIG. 5A, the TDMS information includes, but is not limited to, a Temporary Defect List (TDFL) for recording disc defect management information, a Sequential Recording Range Information (SRRI) applied in a sequential recording mode as information for representing the disc use state, a Space-Bit Map (SBM) applied in a random recording mode, and a Temporary Disc Definition Structure (TDDS) information including recent location information of the TDFL and the SRRI (or SBM). The SRRI and the SUM may not be concurrently used, and either the SRRI or SBM is recorded on the disc depending on the recording mode.

As an example, in the context of the disc structure shown in FIGS. 2A and 2B, each of the TDMA0~TDMA4 includes one or more TDFLs/SBMs/SRRIs each recorded with a TDDS in one cluster at each recording/updating time, as shown in FIG. 5A. That is, each recording of a TDFL/SBM/SRRI with a TDDS is allotted one cluster. Generally, the last sector of each such cluster is designated to store therein the TDDS information as shown in FIG. 5A. However, the first sector, instead of the last sector, of each such cluster can also be used to store the TDDS information.

The TDDS information includes general disc record/playback information, and is generally always checked at the time of loading the disc in the record/playback apparatus since it includes pointer information for indicating the recent locations of the TDFL and the SRRI (or SBM) as described above. According to the disc use state, the TDDS information is continuously updated and the updated TDDS information is written in the TDMA at each update/recording time. Thus, the last TDDS in the latest TDMA used should be checked to access a variety of management information on a current disc use state.

FIG. 5B is a view illustrating the structure of a TDDS according to an embodiment of the present invention. This structure can be applied to any disc structure having a TDDS therein. Referring to FIG. 5B, a variety of information recorded in the TDDS includes, but is not limited to: a TDDS identifier" field 61 and a "TDDS format" field 62 for distinguishing a property of the TDDS; a "TDDS Update Count" field 63 for indicating update times of the TDDS; a "first PSN of Drive Area" field 64 for recording a variety of drive information; a "first PSN of Defect List" field 65 for indicating a first physical sector number of the defect list in case where the disc is closed; a "Location of LSN 0 of User Data Area" field 66 (LSN=last sector number) and a "last LSN of User Data Area" field 67 for indicating a start and an end of the user data area; an "Inner Spare Area 0 size" field 68, an "Outer Spare Area size" field 69 and an "Inner Spare Area 1 size" field 70 for indicating the size of the corresponding spare area; a "Spare Area Full flags" field 71 for selectively indicating whether or not the spare areas are fully used (full); a "Recording Mode" field 72 for indicating a disc recording mode such as a sequential recording mode or a random recording mode; a "general flag bits" field 73 for indicating whether or not the write-protection of the disc exists; an "Inconsistency flags" field 74 for indicating an update state of the TDMS information; a "Last Recorded Address of User Data Area" field 75 for indicating a location of the last recorded user data within the user data area; a "Size of TDMAs in Outer Spare Area" field 76 and a "Size of TDMS in Inner Spare Area 1" field 77 for indicating the size of the corresponding TDMA allocated within the spare area; a "First PSN of $1^{st}$ Cluster of Defect List" field 78 for indicating a first physical sector number of the latest defect list in the latest TDMA area to a "first PSN of 8th Cluster of Defect List" field 79 for indicating the 8th physical sector number (Defect list generally does not exceed four clusters in the single-layer optical disc and eight clusters in the dual-layer optical disc); a "first PSN of SRRI/SBM for L0" field 80 and a "first PSN of SBM for L1" field 81 for indicating the location of the SRRI (or SBM), which is finally recorded in a sequential or random recording mode; a "next available PSN of ISA0" field 82, a "next available PSN of OSA0" field 83, a "next available PSN of ISA1" field 84, a "next available PSN of OSA1" field 85 for indicating a next available physical sector number in the corresponding spare area; and a "Year/Month/Data of recording" field 86 for indicating a recording time, and a "Drive ID" field 87 for indicating a manufacture company, an additional identification, a serial number and the like.

Some of these fields of the TDDS can be non-variable fields (not updated). Such fields may include the "TDDS identifier" field 61, the "Inner Spare Area 0, 1 size" fields 68-70, the "Outer Spare Area size" field 69, the "Recording Mode" field 72, the "Size of TDMAs in Outer Spare Area" field 76, the "Size of TDMAs in Inner Spare Area 1" field 77 among the TDDS information discussed above. For description convenience, information included in these non-variable fields is called "fixed management field" information. Since the fixed management field information is the same no matter which TDDS is played-back, the entire structure of the disc, the recording manner and the like can be determined through this information.

Further, some of the fields of the TDDS may need to be continuously updated according to a need. Such fields may include the "first PSN of 1st Cluster of Defect List" . . . "first PSN Of 8th Cluster of Defect List" field 78 . . . 79, the "next available PSN of ISA0" field 82, the "next available PSN of OSA0" field 83, the "next available PSN of ISA1" field 84, and the "next available PSN of OSA1" field 85. For description convenience, information included in these variable fields is called "variable management field" information.**

Accordingly, if the TDDS information is recorded in the TAI and is played-back according to an embodiment of the present invention, the entire disc structure, the recording manner/mode and the like can be firstly determined through the fixed management field information. For instance, a corresponding TDMA is easily accessed through the size information of the TDMA area included in the fixed management field information.

Figures 6A, 6B:
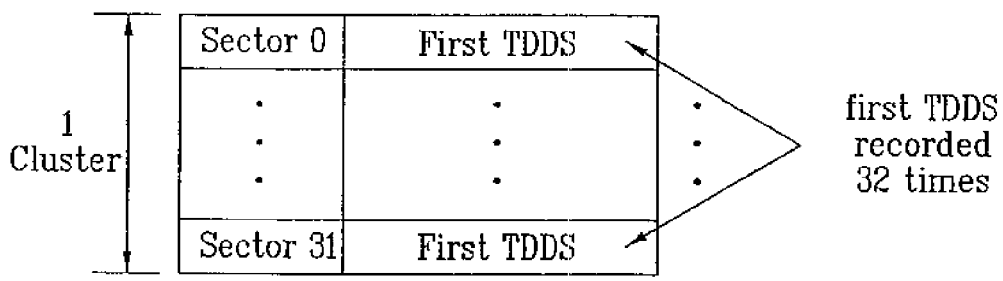
FIGS. 6A and 6B are views illustrating two examples of the contents of a TAI according to an embodiment of the present invention.

FIGS. 6A and 6B illustrate two examples of different contents of the TAI cluster according to an embodiment of the present invention. Although FIGS. 6A and 6B show one TAI cluster, each cluster of the TAI discussed herein can have the same or similar content structure.

Particularly, FIGS. 6A and 6B are examples of recording certain real data into the TAI clusters to selectively place the TAI clusters into the recorded state. Some or all of such real data recorded in the TAI can be directly used to indicate whether or not the TAI cluster(s) is in the recorded state so as to identify the in-use TDMA as discussed above. The use of such real data has an advantage in that additional relevant information can be provided by the TAI in addition to the indication of the current in-use TDMA. It should be noted, however, that dummy data or any other designated signals can be recorded into the TAI clusters to indicate the recorded/ unrecorded state of the TAI clusters. The TAI content structures of FIGS. 6A and 6B are applicable to the TAI and disc structures shown in FIGS. 2A-5B and the methods of FIG. 8.

According to one example as shown in FIG. 6A, the TAI cluster, which corresponds to a particular TDMA (or latest TDMA in case that the TAI cluster indicates the disc closing) as discussed above, includes the latest TDDS information associated with the TDMA corresponding to the TAI cluster, in addition to the information indicating whether the corresponding TDMA is the in-use TDMA. In case where the last TDDS is recorded in the last cluster of each TDMA, the TDMA including the latest TDDS and the in-use-TDMA can be different from each other, which in turn can cause errors when accessing the disc. By providing the additional information in the TAI as in FIG. 6A, such an error can be prevented.

A detailed description of this situation is as follows by referring to FIG. 6A. First, assume that the TAI is recorded in cluster units, a cluster being the minimal recording-unit. In the first sector (Sector 0) of the TAI cluster having 32 sectors, there exist an identification field 92 ("TAI identifier") for allowing the recognition of the TAI information, a TAI format information field 93 ("TAI format") related with a version of the current disc, and a TAI update count field 94 ("TAI update count") for increasing a count value by 1 whenever the TAI is updated. The update count field 94 can also be used even as the information for indicating how many clusters may be present within the TAI. Further, there exists a TDDS location field 95 ("Latest TDDS location") for providing information on the TDMA in which the latest TDDS information is located.

The remaining area 96 of the first sector (Sector 0) of the TAI cluster is used to indicate the recorded or unrecorded state of the TAI cluster by using a predetermined value (for example, setting the field to "00h"). For instance, if the remaining area 96 of Sector 0 of the TAI cluster has certain designated recording as discussed above, then the TAI cluster is said to be in the recorded state to indicate the in-use status of the corresponding TDMA or the disc closing as discussed above in connection with FIGS. 3A-4C.

The TDDS location field 95 in the first sector (Sector 0) of the TAI cluster identifies a TDMA in which the latest TDDS information is recorded irrespective of whether or not that TDMA is fully used up. For example, the values of this field 95 can be defined so that "0000 0000b" means the latest TDDS exists in the TDMA0, "0000 0001b" means the latest TDDS exists in the TDMA2, "0000 0011b" means the latest TDDS exists in the TDMA3, and "00000 0000*b*" means the latest TDDS exists in the TDMA4. Other examples are possible. Accordingly, in the example of FIG. 3C, if the second cluster 50*b* of the TAI 50 alone is in the recorded state (e.g., the area 96 of the TAI cluster 50*b* in FIG. 3C is in the recorded state) and the TDDS location field 95 (i.e., of the second TAI cluster 50*b* in FIG. 3C) has a value of "0000 0000b", it means the usable TDMA is the TDMA1, but the last updated TDDS (latest TDDS information) is located within the TDMA0 on the disc.

In addition, the latest TDDS information is recorded into a TDDS information field 97 ("Latest TDDS") of the second sector (Sector 1 of the TAI cluster). As a result, the TAI can be utilized even for recovering the latest TDDS information directly. This is advantageous since, even if the latest TDDS information recorded in the latest TDMA as part of the TDMS information is damaged, the important TDDS information will not be lost since it can recovered from the TAI recorded in the TDMA0. Some or all of the remaining sectors (98) of the TAI cluster can have a copy of the latest TDDS information stored in the TDDS information field 97. Each TDDS information is recorded in one sector size. Thus, for instance, if 3 sectors of the TAI cluster are each recorded with the same latest TDDS information, this means that the latest TDDS information is stored three times in the TAI.

The latest TDDS information stored in the field 97 of the TAI cluster can be the last TDDS information or the first TDDS information. For instance, if the TDMA corresponding to the TAI cluster becomes the in-use TDMA, then recording in the field 96 is made to indicate that the corresponding TDMA is currently in use. At this time, the first TDDS information recorded in the corresponding TDMA is copied and recorded into the TDDS information field 97 of the TAI cluster as the latest TDDS information. The first TDDS information is recorded in the field 97 because the corresponding TDMA is still in use and is not full at that time. Thus, according to a time point when the TAI is updated, the latest TDDS information recorded in the TAI can be the last TDDS recorded within the corresponding TDMA (e.g., when the corresponding TDMA is full), or can be the first TDDS recorded within the in-use-TDMA (i.e., when the corresponding TDMA is currently available for use).

As another example, the latest TDDS information can be copied up to 32 times into the TAI cluster. Any remaining sector of the TAI cluster can be set to a certain value such as 00h if it is not used. Since each TDDS information recording is allotted with one sector size, this means the entire TAI cluster can be recorded with the same latest TDDS information up to 32 times as shown in FIG. 6B. In this example, the first TDDS information recorded in the corresponding TDMA is recorded 32 times in the TAI cluster. And the recording of the first TDDS information in the TAI cluster is directly used as the TDMA in-use/disc closing indicator of the TAI cluster. This is an example of using the recording of real data (such as the TDDS information) in the TAI cluster to selectively indicate whether or not the TAI cluster is in the recorded state. Thus, the TAI cluster, not only indicates which TDMA is the in-use TDMA or whether or not the disc is closed, but also provides the latest TDDS information associated with the corresponding TDMA.

Accordingly, the optical recording/playing-back apparatus can examine the TAI from the loaded disc to determine whether or not the disc is closed. If the disc is closed, the last TDDS information of the disc can be obtained by reading the latest TDDS information recorded in the TAI cluster. Further, the TAI can be examined to identify the location of the in-use TDMA since it indicates which TDMA is currently the in-use TDMA. Further, by accessing and using the "fixed management field" information within the TDDS information recorded in the corresponding TAI cluster, the spare areas can be allocated or not allocated on the disc, and the allocation size of the spare areas and/or TDMAs may be obtained.

After that, the recording/playing-back apparatus can move a pickup to the in-use-TDMA area to perform the scan from the beginning of the corresponding TDMA area, thereby confirming the last recorded TDDS. Therefore, the "variable management field" information recorded in the TDDS can be confirmed and the confirmed information can be used to allow the reading of the last TDFL, SRRI (or SBM), thereby reading information on the entire disc recording state and defect areas.

Hereinafter, the optical recording and playback method and apparatus using the TAI according to an embodiment of the present invention is discussed.

Figure 7:
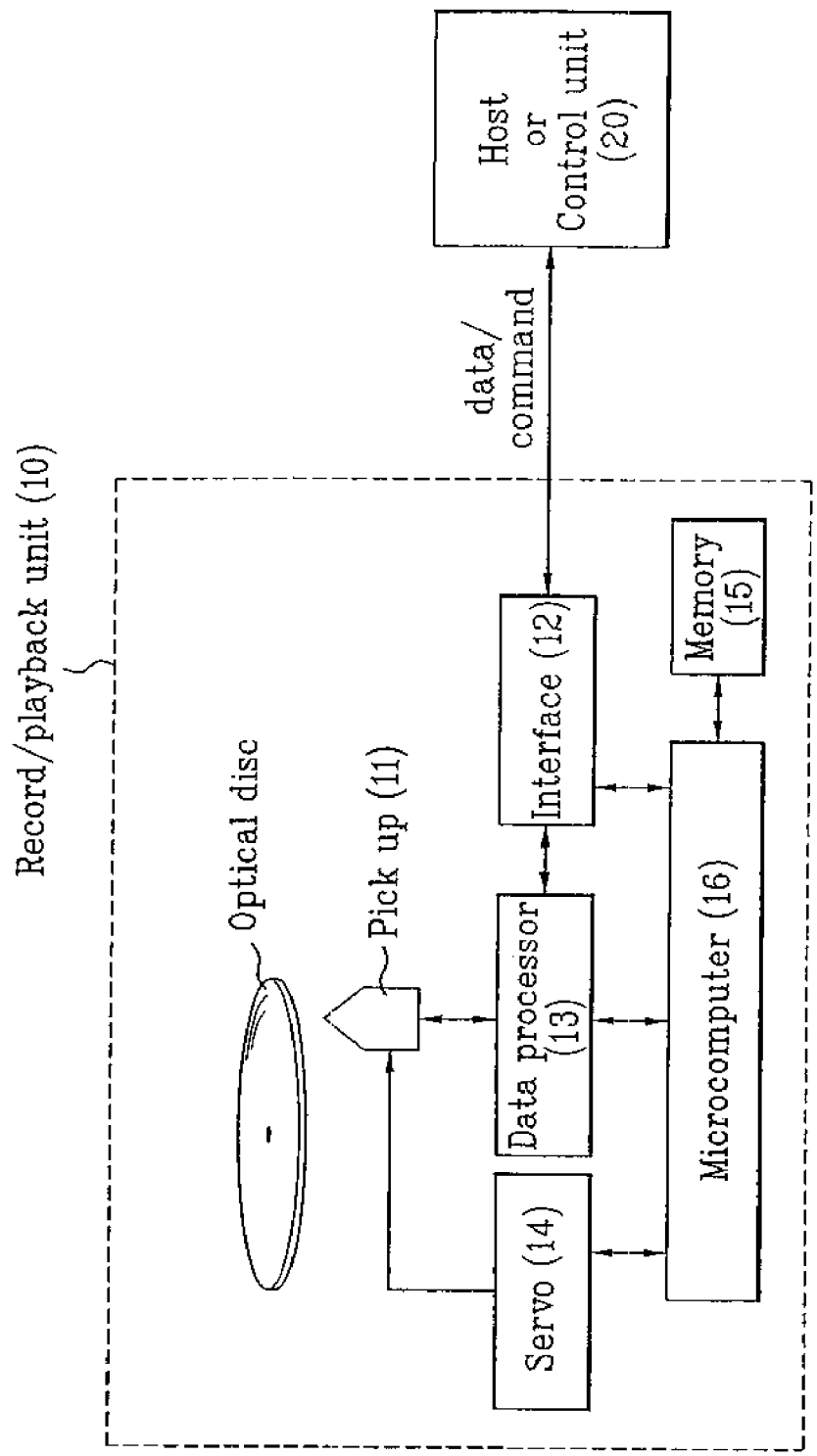
FIG. 7 is a block diagram illustrating an optical recording/reproducing apparatus according to an embodiment of the present invention.

FIG. 7 illustrates a recording/reproducing apparatus according to an embodiment of the present invention. The methods of the present invention can be implemented by the apparatus of FIG. 7 or other suitable device/system. The recording/reproducing apparatus includes a recording/reproducing unit 10 for performing reproduction and/or recording from/on an optical disc, and a control unit (or host) 20 for controlling the recording/reproducing unit 10. The control unit 20 sends a record command or a reproduce command for a specific area on the disc to the reproducing unit 10. The recording/reproducing unit 10 performs the recording/reproduction in the specific area according to the command of the control unit 20. The recording/reproducing unit 10 can employ an optical drive.

The recording/reproducing unit 10 can include an interface unit 12 for performing communication with an external device such as the control unit 20; a pickup unit 11 for directly recording or reproducing data to/from the optical disc; a data processor 13 for receiving the reproduction signal from the pickup unit 11 to convert the receive signal into appropriate signal values, or for modulating a to-be-recorded signal into an appropriate recording signal for the optical disc; a servo unit 14 for controlling the pickup unit 11 to precisely read the signals from the optical disc, or to precisely record the signals on the optical disc; a memory 15 for temporarily storing a variety of information including the management information and data; and a microprocessor 16 for controlling the operations and structural elements within the unit 10.

A description of a disc playback method using the TAI in a recording/reproducing apparatus according to any embodiment of the present invention is now provided referring to FIG. 8.

As shown in FIG. 8, if the write-once optical disc is loaded in the optical recording/reproducing apparatus, the apparatus moves to the TDMA0 of the disc to read the TAI (S10). It is determined whether or not the loaded disc is closed by examining the TAI information, particularly, the DMA disc-closing indicator of the TAI (S20).

At this time, if it is determined that the disc is closed since the DMA disc closing indicator cluster is in the recorded state, the apparatus moves the pick-up unit to a designated area (e.g., a DMA) to read the last recorded management information (S30). In case where the disc is closed as described above, recording on the disc can no longer be performed. Therefore, the management information is utilized to perform the playback of data (S40). On the other hand, if it is determined that if the disc is not closed, the recording/reproducing apparatus moves to the in-use-TDMA indicated by the TDMA in-use indicator cluster(s) of the TAI to read the management information including the latest TDDS information recorded in the in-use-TDMA (S50). Such TDDS information may also be obtained from the TAI. Also the recording/reproducing apparatus first reads the "fixed management field" information from the TDDS recorded in the TAI to obtain information on the entire disc structure and the like and then, can also move to the currently in-use TDMA area to read the latest "variable management field" information.

As described above, after the last management information of the disc is read, the data is recorded or played-back according to a user's selection or as needed (S60).

Applying the method of FIG. 8 to the apparatus of FIG. 7, if the optical disc is loaded, the recording/reproducing unit 10 obtains a variety of recorded disc information from the loaded optical disc. Specifically, if the loaded optical disc is the write-once optical disc, for example, BD-WO, the microcomputer 16 accesses the TAI and obtains the TAI information recorded in the TDMA0 area in order to determine whether or not the loaded disc is closed and to obtain the location of the in-use-TDMA.

If the disc is determined to be closed in view of the TAI information, the recording can be no longer performed on the disc. Therefore, the recording/reproducing unit 10 performs the disc playback through a playback command of the control unit 20 under the control of the microcomputer 16. If the disc is not closed in view of the TAI information, the location of the in-use-TDMA to obtain the last TDMS information recorded in the in-use TDMA is obtained from the TAI, and the obtained TDMS information is utilized to perform the playback by the recording/reproducing unit 10 under the control of the microcomputer 16 according to a playback command of the control unit 20.

On the other hand, a method for recording the TAI using the optical recording/reproducing apparatus of FIG. 7 according to an embodiment of the present invention is described as follows.

The microcomputer 16 within the playback unit 10 records the TDMS information to the plurality of TDMAs in a specific use sequence. For example, the TDMA0 first is used. If the TDMA0 is fully used up, the TDMA1 in-use indicator cluster of the TAI within the TDMA0 is changed to be in the recorded state to indicate that the TDMA1 is currently in use. The recorded state of the TDMA1 in-use indicator cluster can be realized by recording the recorded TDDS information already recorded in the TDMA0 or some other designated data as discussed above.

In case where there is no longer any cluster to be recorded or the disc is closed by a closing command of the control unit 20 according to a user's request or like while recording is performed, the microcomputer 16 controls to transfer and record the latest TDMS information, which is recorded in the latest TDMA, into each of the DMAs (duplicate recording for redundancy purpose), and controls to change the DMA disc closing indicator cluster of the TAI to be in the recorded state.

When the disc is in an idle state or in a disc eject state after the disc recording is all finished, the location of the in-use-TDMA is determined such that the above operation can change the specific cluster within the corresponding TAI to be in a batch record state.

As described above, the present invention has an advantage in that the write-once optical disc is efficiently used through a method for recording and using the TAI including both the TDMA in-use indicator(s) and the disc closing indicator. By accessing the TAI initially, the identity of the in-use TDMA at that time can be quickly obtained, information on whether or not the disc is closed can be easily obtained, and management information such as the latest TDDS information can also be easily obtained.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for recording management information on a writable recording medium, the recording medium including one or more temporary management areas being used in a designated order for storing therein temporary management information until the recording medium is closed and a final management area for storing therein final management information when the recording medium is to be closed, the apparatus comprising:
   a pickup adapted for recording data on the recording medium; and
   a microcomputer configured to control the pickup to record data onto a first indicator when closing the recording medium so as to indicate that the recording medium is closed, the first indicator located at the most front position of a first temporary management area being used first among the one or more temporary management areas.

2. The apparatus of claim 1, wherein the first indicator consists of one cluster and the first head cluster of the first temporary management area is used as the first indicator.

3. The apparatus of claim 2, wherein the microcomputer is configured to control the pickup to record the latest temporary disc definition structure information stored in the one or more temporary management areas onto the first indicator when the recording medium is to be finalized.

4. The apparatus of claim 2, wherein the first temporary management area is located in a lead-in area of the recording medium.

5. The apparatus of claim 4, wherein the microcomputer is configured to control the pickup to record data onto a second indicator among one or more second indicators so as to indicate which temporary management area is currently available for use where the one or more second indicators respectively correspond, in a direction of descending address, to the temporary management areas except the first temporary management area.

6. The apparatus of claim 5, wherein each of the one or more second indicators consists of one cluster and one or more clusters starting from the second head cluster of the first defect management area are used as the one or more second indicators.

7. The apparatus of claim 5, wherein the microcomputer is configured to control the pickup to record temporary disc definition structure information stored first in a temporary management area currently available for use onto a second indicator corresponding to the temporary management area currently available for use when the temporary management area currently available for use becomes available.

8. The apparatus of claim 4, further comprising:
   a host configured to send a record/reproduce command for a specific area of the recording medium via an interface, wherein the microcomputer is configured to control the pickup to perform recording/reproducing in the specific area according to the command from the host.

9. An apparatus for recording management information on a writable recording medium, the recording medium including one or more temporary management areas being used in a designated order for storing therein temporary management information until closing the recording medium and a final management area for storing therein final management information when the recording medium is to be closed, the apparatus comprising:
   a pickup configured to directly record/reproduce data to/from the recording medium;
   a data processor configured to convert a signal from the pickup into an appropriate signal value or modulate a to-be-recorded signal into an appropriate recording signal for the recording medium;
   a servo configured to control the pickup to precisely read/record signals from/to the recording medium;
   a memory configured to temporarily store information associated with the recording medium;
   an interface configured to perform communication with an external device; and
   a microcomputer configured to control operations of above elements—the pickup, the pickup, the data processor, the servo, the memory and the interface—in the apparatus, wherein the apparatus is configured to record data onto a first indicator, under the control of the microcomputer, when closing the recording medium so as to indicate that the recording medium is closed, the first indicator located at the most front position of a first temporary management area being used first among the one or more temporary management areas.

10. The apparatus of claim 9, wherein the first indicator consists of one cluster and the first head cluster of the first temporary management area is used as the first indicator.

11. The apparatus of claim 10, wherein the apparatus is configured to record the latest temporary disc definition structure information stored in the one or more temporary management areas onto the first indicator, under the control of the microcomputer, when the recording medium is to be finalized.

12. The apparatus of claim 10, wherein the first temporary management area is located in a lead-in area of the recording medium.

13. The apparatus of claim 12, wherein the apparatus is configured to record data onto a second indicator among one or more second indicators, under the control of the microcomputer, so as to indicate which temporary management area is currently available for use where the one or more second indicators respectively correspond, in a direction of descending address, to the temporary management areas except the first temporary management area.

14. The apparatus of claim 13, wherein each of the one or more second indicators consists of one cluster and one or more clusters starting from the second head cluster of the first defect management area are used as the one or more second indicators.

15. The apparatus of claim 13, wherein the apparatus is configured to record temporary disc definition structure information stored first in a temporary management area currently available for use onto a second indicator corresponding to the temporary management area currently available for use, under the control of the microcomputer, when the temporary management area currently available for use becomes available.

16. The apparatus of claim 12, further comprising:
a host configured to send a record/reproduce command for a specific area of the recording medium via the interface, wherein the apparatus is configured to perform recording/reproducing in the specific area according to the command from the host.

17. An apparatus for reproducing management information from a writable recording medium, the recording medium including one or more temporary management areas being used in a designated order for storing therein temporary management information until closing the recording medium and a final management area for storing therein final management information when the recording medium is to be closed, the apparatus comprising:
a pickup configured to reproduce data from the recording medium;
a microcomputer configured to control the pickup to access a first indicator located at the most front position of a first temporary management area being used first among the one or more temporary management areas; and determine whether or not the recording medium has been closed based on whether the first indicator has recorded data or not.

18. The apparatus of claim 17, wherein the first indicator consists of one cluster and the first head cluster of the first temporary management area is used as the first indicator, wherein the microcomputer is configured to control the pickup to access the first head cluster in order to determine whether or not the recording medium has been closed.

19. The apparatus of claim 18, wherein when the recording medium has been closed the microcomputer is configured to control the pickup to read the final management information from the final management area.

20. The apparatus of claim 19, wherein when the recording medium has not been closed the microcomputer is configured to control the pickup to access one or more second indicators so as to determine a temporary management area currently available for use, where the one or more second indicators respectively correspond, in a direction of descending address, to the temporary management areas except the first temporary management area.

21. The apparatus of claim 20, wherein the microcomputer is configured to control the pickup to access the first temporary management area located in a lead-in area of the recording medium in order to access the first and second indicators.

22. The apparatus of claim 20, wherein each of the one or more second indicators consists of one cluster and one or more clusters starting from the second head cluster of the first defect management area are used as the one or more second indicators, wherein the microcomputer is configured to control the pickup to access the one or more clusters in order to determine which temporary management area is currently available for use.

23. The apparatus of claim 20, wherein the microcomputer is configured to determine a temporary management area corresponding to a second indicator having recorded data last as the temporary management area currently available for use.

24. The apparatus of claim 23, wherein the microcomputer is configured to control the pickup to reproduce, from at least one of sectors configuring the second indicator having recorded data last, temporary disc definition structure information identical to temporary disc definition structure information stored first in the temporary management area determined currently available for use.

25. The apparatus of claim 23, wherein the microcomputer is configured to control the pickup to reproduce the temporary management information from the temporary management area determined currently available for use.

26. The apparatus of claim 23, further comprising:
a host configured to send a record/reproduce command for a specific area of the recording medium via an interface, wherein the microcomputer is configured to control the pickup to perform recording/reproducing in the specific area according to the command from the host.

27. An apparatus for reproducing management information from a writable recording medium, the recording medium including one or more temporary management areas being used in a designated order for storing therein temporary management information until closing the recording medium and a final management area for storing therein final management information when the recording medium is to be closed, the apparatus comprising:
a pickup configured to reproduce data from the recording medium; and
a data processor configured to convert a signal from the pickup into an appropriate signal value;
a servo configured to control the pickup to precisely read signals from the recording medium;
a memory configured to temporarily store information associated with the recording medium;
an interface configured to perform communication with an external device; and
a microcomputer configured to control operations of above elements—the pickup, the pickup, the data processor, the servo, the memory and the interface—in the apparatus, wherein the apparatus is configured to access, under control of the microcomputer, a first indicator located at the most front position of a first temporary management area being used first among the one or more temporary management areas; and determine whether or not the recording medium has been closed based on whether the first indicator has recorded data or not.

28. The apparatus of claim 27, wherein the first indicator consists of one cluster and the first head cluster of the first temporary management area is used as the first indicator, wherein the apparatus configured to access the first head cluster, under the control of the microcomputer, in order to determine whether or not the recording medium has been closed.

29. The apparatus of claim 28, wherein when the recording medium has been closed the apparatus is configured to read the final management information from the final management area under the control of the microcomputer.

30. The apparatus of claim 29, wherein when the recording medium has not been closed the apparatus is configured to access one or more second indicators, under the control of the microcomputer, so as to determine a temporary management area currently available for use where the one or more second indicators respectively correspond, in a direction of descending address, to the temporary management areas except the first temporary management area.

31. The apparatus of claim 30, wherein the apparatus is configured to access the first temporary management area located in a lead-in area of the recording medium, under the control of the microcomputer, in order to access the first and second indicators.

32. The apparatus of claim 30, wherein each of the one or more second indicators consists of one cluster and one or more clusters starting from the second head cluster of the first defect management area are used as the one or more second indicators, wherein the apparatus is configured to access the one or more clusters in order to determine which temporary management area is currently available for use under the control of the microcomputer.

33. The apparatus of claim 30, wherein the apparatus is configured to determine a temporary management area corresponding to a second indicator having recorded data last as the temporary management area currently available for use.

34. The apparatus of claim 33, wherein the apparatus is configured to reproduce, from at least one of sectors configuring the second indicator having recorded data last, temporary disc definition structure information identical to temporary disc definition structure information stored first in the temporary management area determined currently available for use under the control of the microcomputer.

35. The apparatus of claim 33, wherein the apparatus is configured to reproduce the temporary management information from the temporary management area determined currently available for use under the control of the microcomputer.

36. The apparatus of claim 33, further comprising:
a host configured to send a record/reproduce command for a specific area of the recording medium via the interface, wherein the apparatus is configured to perform recording/reproducing in the specific area according to the command from the host.

37. A method of recording management information on a writable recording medium, the recording medium including one or more temporary management areas being used in a designated order for storing therein temporary management information until the recording medium is closed and a final management area for storing therein final management information when the recording medium is to be closed, the method comprising a step of:
recording data onto a first indicator when the recording medium is closed so as to indicate that the recording medium is closed, the first indicator located at the most front position of a first temporary management area being used first among the one or more temporary management areas.

38. A method of reproducing management information from a writable recording medium, the recording medium including one or more temporary management areas being used in a designated order for storing therein temporary management information until closing the recording medium and a final management area for storing therein final management information when the recording medium is to be closed, the method comprising steps of:
accessing a first indicator located at the most front position of a first temporary management area being used first among the one or more temporary management areas; and
determining whether or not the recording medium has been closed based on whether the first indicator has recorded data or not.

39. An optical computer-readable recording medium comprising:
one or more temporary management areas being used in a designated order for storing therein temporary management information until closing the recording medium;
a final management area for storing therein final management information when the recording medium is to be closed; and
a first indicator located at the most front position of a first temporary management area being used first among the one or more temporary management areas and indicating whether or not the recording medium has been closed.

40. The optical computer-readable recording medium of claim 39, wherein the first indicator consists of one cluster and the first head cluster of the first temporary management area is used as the first indicator.

41. The optical computer-readable recording medium of claim 40, wherein when the recording medium has closed the first indicator has recorded data therein.

42. The optical computer-readable recording medium of claim 41, further comprising:
one or more second indicators respectively corresponding, in a direction of descending address, to the temporary management areas except the first temporary management area and indicating which temporary management area is currently available for use.

43. The optical computer-readable recording medium of claim 42, wherein the first temporary management area is located in a lead-in area of the recording medium.

44. The optical computer-readable recording medium of claim 42, wherein each of the one or more second indicators consists of one cluster and one or more clusters starting from the second head cluster of the first defect management area are used as the one or more second indicators.

45. The optical computer-readable recording medium of claim 44, wherein when a temporary management area has been currently available for use a cluster corresponding to the temporary management area having been currently available for use has recorded data therein.

* * * * *